United States Patent
Faig et al.

(10) Patent No.: US 12,440,434 B2
(45) Date of Patent: Oct. 14, 2025

(54) COSMETIC COMPOSITION PROVIDING UNIQUE SENSATIONS

(71) Applicant: L'OREAL, Paris (FR)

(72) Inventors: Jonathan James Faig, Sayreville, NJ (US); David Chan, Edison, NJ (US); Hy Si Bui, Piscataway, NJ (US); Susan Halpern Chirch, Basking Ridge, NJ (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 17/360,415

(22) Filed: Jun. 28, 2021

(65) Prior Publication Data

US 2021/0401702 A1    Dec. 30, 2021

Related U.S. Application Data

(60) Provisional application No. 63/046,237, filed on Jun. 30, 2020.

(30) Foreign Application Priority Data

Sep. 7, 2020 (FR) ........................ 2009049

(51) Int. Cl.
| | |
|---|---|
| *A61K 8/37* | (2006.01) |
| *A61K 8/06* | (2006.01) |
| *A61K 8/73* | (2006.01) |
| *A61K 8/81* | (2006.01) |
| *A61Q 19/08* | (2006.01) |

(52) U.S. Cl.
CPC ............ *A61K 8/37* (2013.01); *A61K 8/062* (2013.01); *A61K 8/732* (2013.01); *A61K 8/8147* (2013.01); *A61Q 19/08* (2013.01); *A61K 2800/524* (2013.01)

(58) Field of Classification Search
None
See application file for complete search history.

(56) References Cited

U.S. PATENT DOCUMENTS

| | | | | |
|---|---|---|---|---|
| 4,981,845 | A * | 1/1991 | Pereira | A61Q 17/04 514/657 |
| 5,439,672 | A * | 8/1995 | Zabotto | A61K 9/1277 424/59 |
| 9,883,991 | B2 | 2/2018 | Behler et al. | |
| 2001/0048933 | A1 * | 12/2001 | L'Alloret | A61K 8/0229 424/78.17 |
| 2005/0008587 | A1 * | 1/2005 | Schulz | A61Q 19/00 424/59 |
| 2005/0244442 | A1 * | 11/2005 | Sabino | A61K 8/26 424/401 |
| 2010/0173027 | A1 * | 7/2010 | Kroepke | A61K 8/342 514/738 |
| 2019/0282458 | A1 * | 9/2019 | Villarreal, Jr. | A61K 8/9789 |

FOREIGN PATENT DOCUMENTS

| | | | | | |
|---|---|---|---|---|---|
| CN | 105694594 | A | * | 6/2016 | |
| CN | 108289816 | A | * | 7/2018 | ............ A61K 8/02 |
| DE | 202006001274 | U1 | * | 5/2006 | ............ A61K 8/06 |
| DE | 102009048977 | A1 | | 4/2011 | |
| DE | 102015222073 | A1 | | 5/2017 | |
| EP | 2179986 | A1 | | 4/2010 | |
| EP | 2712608 | A2 | | 4/2014 | |
| KR | 20060038822 | A | * | 5/2006 | |
| WO | WO-2016159457 | A1 | * | 10/2016 | ............ A61K 8/042 |
| WO | WO-2017057944 | A1 | * | 4/2017 | ............ A61K 8/02 |

OTHER PUBLICATIONS

DE-202006001274-U1, pe2e machine translation, May 2006 (Year: 2006).*
CN-108289816-A, pe2e machine translation, Jul. 2018 (Year: 2018).*
CN-105694594-A, pe2e machine translation, Jun. 2016 (Year: 2016).*
EP2712608, EPO machine translation, Feb. 2014 (Year: 2014).*
WO-2016159457-A1, pe2e machine translation, Oct. 2016 (Year: 2016).*
Partial Machine Translation of WO2017057944 (Year: 2017).*
TA Instruments, Understanding Rheology of Structured Fluids, https://www.semanticscholar.org/paper/Understanding-Rheology-of-Structured-Fluids/7786863fc167604a487116013cf453fc500412b1, 2013 (Year: 2013).*
Machine translation of KR20060038822 (Year: 2006).*
International Search Report and Written Opinion issued on Nov. 4, 2021 for corresponding PCT Application No. PCT/US2021/039378.
Preliminary Search Report and Written Opinion issued on May 21, 2021 for corresponding French Application No. 2009049.
"High-spreading ester emollient for body care concepts", Research disclosure, Kenneth Mason Publications, vol. 524, No. 6, 2007, p. 1184 XP007137788.

* cited by examiner

*Primary Examiner* — Jennifer A Berrios
(74) *Attorney, Agent, or Firm* — POLSINELLI PC

(57) ABSTRACT

A cosmetic composition providing a unique tactile sensation comprising about 0.1 to about 10 wt. % of a nonionic emulsifier; about 0.1 to about 10 wt. % of sodium polyacrylate; about 0.5 to about 15 wt. % of aluminum starch octenylsuccinate; about 0.1 to about 20 wt. % of a fatty phase that is a liquid at a temperature of 25° C. or more, the fatty phase comprising one or more fatty compounds; and water, wherein the cosmetic composition is an oil-in-water emulsion and all weight percentages are based on the total weight of the cosmetic composition. The nonionic emulsifier includes at least polyglyceryl-3 methylglucose distearate. Methods for treating damaged skin with cosmetic compositions are also disclosed.

15 Claims, 4 Drawing Sheets

COSMETIC COMPOSITION PROVIDING UNIQUE SENSATIONS

CROSS-REFERENCE TO RELATED APPLICATIONS

This application claims benefit of U.S. Provisional Application Ser. No. 63/046,237, filed Jun. 30, 2020, and French Patent Application No. 2009049, filed Sep. 7, 2020, which are incorporated herein by reference in their entirety.

FIELD OF THE DISCLOSURE

The instant disclosure relates to cosmetic compositions providing a unique sensorial experience. Additionally, aspects of the instant disclosure relate to methods for treating damaged skin with cosmetic compositions.

BACKGROUND OF THE DISCLOSURE

Skin acts as a natural barrier between internal and external environments and therefore plays an important role in vital biological functions such as protection against mechanical and chemical injury, microorganisms, and ultraviolet damage. The health and appearance of skin, however, can deteriorate due to environmental factors, genetic makeup, nutrition, and sun exposure.

Environmental pollution conditions are fast worsening and becoming more apparent in the daily life of consumers worldwide. The damage of pollution against human skin is also becoming more and more evident. Human skin is also subjected to a variety of insults by extrinsic factors such as ultraviolet (UV) radiation, environmental pollution, wind, heat, infrared radiation, low humidity, harsh surfactants, abrasives, etc. Recent studies suggest that in addition to UV radiation, other environmental factors contribute to the development of solar lentigines, particularly air pollution. Ultimately, these factors result in visible signs of skin damage including small brown patches on the skin, especially in the elderly.

Typical skin damage includes fine lines, wrinkling, hyperpigmentation, sallowness, sagging, dark under-eye circles, puffy eyes, enlarged pores, visible dead skin, i.e., flaking, scaling, dryness, and roughness. Consumers desire to slow the gaining of skin damage and reduce the effects of aging, especially in the face and around the eyes. Radiant and clear skin appears youthful and is a sign of good health and vitality.

Accordingly, there is an ongoing need for new and improved formulations that improve the health and visual appearance of skin.

SUMMARY OF THE DISCLOSURE

The present disclosure relates to cosmetic compositions providing a unique sensorial experience. For example, the cosmetic compositions typically have a structure that provides the visual appearance of a creme before and/or upon application of the cosmetic composition to a user's skin. As the user applies (e.g., by rubbing, spreading, and/or massaging) the cosmetic composition onto his or her skin, the cosmetic composition has a tactile sensation of a serum. The composition subsequently undergoes thixotropy and provides a tactile sensation of a creme.

The cosmetic compositions of the instant disclosure typically include:

(a) about 0.1 to about 10 wt. %, preferably about 0.1 to about 4 wt. %, of a nonionic emulsifier, the nonionic emulsifier comprising polyglyceryl-3 methylglucose distearate;
(b) about 0.1 to about 10 wt. %, preferably, about 0.5 to about 3 wt. %, of sodium polyacrylate;
(c) about 0.1 to about 15 wt. %, preferably about 0.1 to about 5 wt. % of mattifying agents;
(d) about 0.1 to about 20 wt. %, preferably about 0.1 to about 14 wt. % of a fatty phase that is a liquid at 25° C. or more, wherein the fatty phase comprises one or more fatty compounds; and
(e) water,
wherein the cosmetic composition is an oil-in-water emulsion and all weight percentages are based on the total weight of the cosmetic composition.

Preferably, the cosmetic composition is formulated to exhibit thixotropy during application of the cosmetic composition. The cosmetic composition may have a playtime of about 5 or more seconds and, in some cases, about 30 or more seconds. Additionally or alternatively, the cosmetic composition may exhibit a coefficient of friction of 0.3 or less at 10 mm/s.

Suitable nonionic emulsifiers include those chosen from polyglyceryl 10-stearate, polyglyceryl-3-caprate, polyglyceryl-3-diisostearate, polysorbate 20, or a mixture thereof. Suitable mattifying agents include but are not limited to the following: aluminum starch octenylsuccinate, methyl methacrylate crosspolymers, polymethylsilsesquioxane, cellulose, and silica silylate.

The fatty compounds may be chosen from fatty alcohols, fatty acids, fatty esters, oils, waxes, derivatives thereof, and mixtures thereof. In some cases, the fatty compound is chosen from ethoxylated fatty esters, sorbitan fatty esters, esters of stearates, esters of behenates, esters of arachidates, esters of palmitates, fatty acid esters of a sugar, and mixtures thereof. Additionally or alternatively, the fatty ester may be chosen from cetearyl octanoate, isopropyl myristate, isopropyl palmitate, $C_{12}$-$C_{15}$ alkyl benzoate, 2-ethylphenyl benzoate, isopropyl lanolate, hexyl laurate, diisopropyl adipate, isononyl isononanoate, oleyl erucate, 2-ethylhexyl palmitate, isostearyl isostearate, diisopropyl sebacate, octanoates, decanoates or ricinoleates of alcohols or polyalcohols, hydroxylated esters, and pentaerythritol esters, and mixtures thereof. Preferably, the one or more fatty compounds comprises isononyl isononanoate, caprylic/capric triglyceride, *Glycine soja* (soybean) oil, or a mixture thereof.

The cosmetic composition may include about 1 to about 30 wt. % of a water-soluble solvent. Non-limiting examples of water-soluble solvents include ethylene glycol, propylene glycol, butylene glycol, hexylene glycol, pentylene glycol, diethylene glycol, dipropylene glycol, caprylyl glycol, 1,3 propanediol, glycerin, diglycerin, polyethylene glycols, and a mixture thereof.

In some cases, the cosmetic composition may include about 0.1 to about 20 wt. % of a non-sodium polyacrylate thickening agent. The non-sodium polyacrylate thickening agent may be chosen from ammonium polyacryloyldimethyl taurate, ammonium acryloyldimethyltaurate/VP copolymer, sodium polyacrylate, acrylates copolymers, polyacrylamide, carbomer, acrylates/C10-30 alkyl acrylate crosspolymer, acrylates/beheneth-25 methacrylate copolymer, and a mixture thereof.

BRIEF DESCRIPTION OF THE DRAWINGS

Implementation of the present technology will now be described, by way of example only, with reference to the attached figures, wherein.

Figure 1:
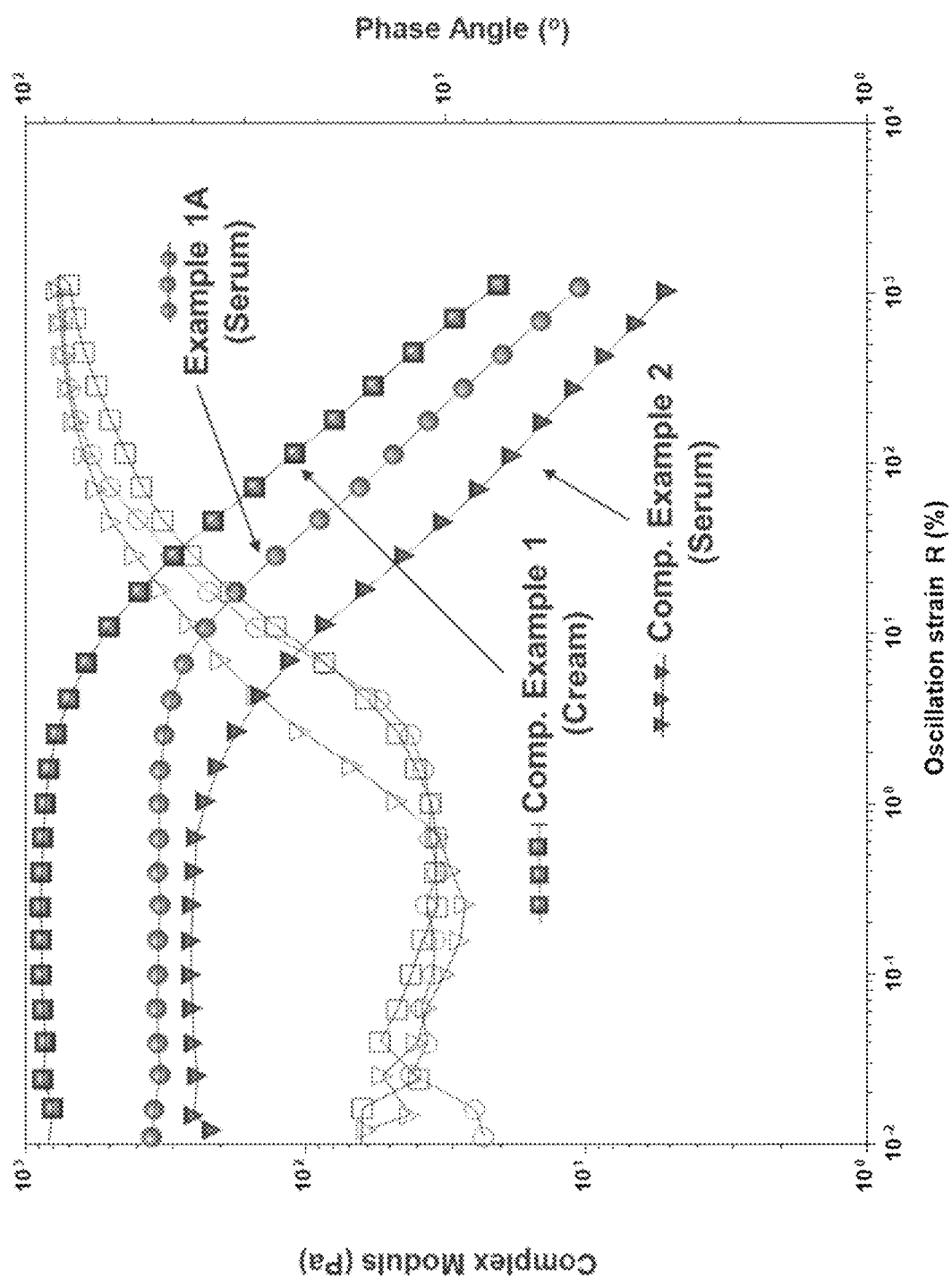
FIG. 1 is a graph of complex modulus G* and phase angle δ of example cosmetic composition as function of strain deformation according to aspects of the disclosure.

It should be understood that the various aspects are not limited to the arrangements and instrumentality shown in the drawings

DETAILED DESCRIPTION OF THE DISCLOSURE

The present disclosure relates to cosmetic compositions providing a unique sensorial experience. The inventors discovered that specific ingredients in certain combinations and amounts provide cosmetic compositions exhibiting a unique sensory experience.

The cosmetic compositions of the instant disclosure typically include:
 (a) about 0.1 to about 10 wt. %, preferably about 0.1 to about 4 wt. %, more preferably about 0.5 to about 3 wt. % of a nonionic emulsifier, the nonionic emulsifier comprising polyglyceryl-3 methylglucose distearate;
 (b) about 0.1 to about 10 wt. %, preferably about 0.5 to about 3 wt. %, more preferably about 0.6 to about 3 wt. % of sodium polyacrylate;
 (c) about 0.1 to about 15 wt. %, preferably about 0.1 to about 5 wt. %, more preferably about 0.1 to about 3 wt. % of mattifying agent;
 (d) about 0.1 to about 20 wt. %, preferably about 0.1 to about 14 wt. % of a fatty phase that is a liquid at a temperature of 25° C. or more, wherein the fatty phase comprises one or more fatty compounds; and
 (e) water,
  wherein the cosmetic composition is an oil-in-water emulsion and all weight percentages are based on the total weight of the cosmetic composition.

The cosmetic compositions typically have a structure that provides the visual appearance of a creme before and upon application of the cosmetic composition to a user's skin. As the user actively applies (e.g., by rubbing, spreading, and/or massaging) the cosmetic composition onto the user's skin, the shear stress produced by the active application of the cosmetic composition reduces the viscosity of the cosmetic composition to an extent that the cosmetic composition provides the tactile sensation of a serum. In some instances, the cosmetic composition is formulated such that the viscosity of the composition decreases by about 30% or more, for example, by about 35% or more, by about 40% or more, by about 45% or more, by about 50% or more, by about 55% or more, by about 60% or more, by about 65% or more, by about 70% or more, by about 75% or more, by about 80% or more, by about 85% or more, by about 90% or more, by about 95% or more, or by about 99% or more under a shear stress of $10^2$/s to $10^3$/s (e.g., $10^{2.25}$/s, $10^{2.5}$/s, or $10^{2.75}$/s) Additionally, the cosmetic composition may have a complex modulus (G*) at 0.1% strain of about 100 Pa or more, about 150 Pa or more, about 200 Pa or more, about 300 Pa or more, about 350 Pa or more, about 400 Pa or more, about 450 Pa or more, about 500 Pa or more, about 550 Pa or more and/or about 1000 Pa or less, about 950 Pa or less, about 900 Pa or less, about 850 Pa or less, about 800 Pa or less, about 750 Pa or less, about 700 Pa or less, about 650 Pa or less, about 600 Pa or less, or about 550 Pa or less and a phase angle of between about 8° to about 17°, between about 10° to about 15°, or between about 11° to about 14° before application of the cosmetic composition. Additionally or alternatively, the phase angle may be about 45° or less, about 40° or less, about 35° or less, about 30° or less, about 25° or less, about 20° or less, about 15° or less, about 10° or less, about 5° or less.

Preferably, the cosmetic composition exhibits thixotropy. For example, the cosmetic composition may undergo thixotropy and have a dynamic viscosity of 5,000 Pa/s up to 100,000 Pa/s. In some cases, the dynamic viscosity may be 10,000 Pa/s up to 100,000 Pa/s, 20,000 Pa/s up to 100,000 Pa/s, 30,000 Pa/s up to 100,000 Pa/s, 40,000 Pa/s up to 100,000 Pa/s, 50,000 Pa/s up to 100,000 Pa/s, 60,000 Pa/s up to 100,000 Pa/s, 70,000 Pa/s up to 100,000 Pa/s, or 90,000 Pa/s up to 100,000 Pa/s, or any ranges or subranges therebetween. In some cases, the cosmetic composition provides an extended amount of playtime. Playtime may, in some cases, be determined based on the amount of time for the cosmetic composition or one or more ingredients of the cosmetic composition to absorb. In some cases, the cosmetic composition has a playtime of about 5 seconds or more, about 10 seconds or more, about 20 seconds or more, about 30 seconds or more, about 40 seconds or more, about 50 seconds or more, or about 60 seconds.

Subsequent to the playtime, the cosmetic composition then provides a tactile feel of a creme post absorption. Preferably, the cosmetic composition has a coefficient of friction of 0.3 or less at 10 mm/s. For instance, the cosmetic composition may have a coefficient of friction of about 0.6 or less, about 0.5 or less, about 0.4 or less, about 0.3 or less, about 0.28 or less, about 0.26 or less, about 0.24 or less, about 0.22 or less, about 0.2 or less, about 0.18 or less, about 0.16 or less, about 0.14 or less, or about 0.12 or less at a speed of 10 mm/s. The coefficient of friction may also be about 0.02 or more, preferably about 0.04 or more, preferably about 0.06 or more, preferably about 0.08 or more, or preferably about 0.1 or more at a speed of 10 mm/s.

The cosmetic composition are generally formulated as an emulsion. Typically, the cosmetic compositions are formulated to be oil-in-water emulsions, with the fatty phase emulsified in the hydrophilic phase. However, in some instances, the cosmetic compositions may be formulated to have a hydrophilic phase (e.g., alcohols, glycols, polyols, etc.) emulsified in the fatty phase. The cosmetic composition may be formulated, in some cases, to be lotions, serums, creams, sprays or any other suitable form of product.

Additionally, the instant disclosure relates to methods for treating skin that include the application of the cosmetic composition of the instant disclosure to the skin. The cosmetic compositions may also be useful in methods for treating and/or repairing skin damage due to photoaging, and diminishing the appearance of wrinkles, dark spots, and uneven skin texture. The aforementioned methods may be non-therapeutic.

Suitable components, such as those listed below, may be included or excluded from the formulations for the cosmetic compositions depending on the specific combination of other components, the form of the cosmetic compositions, and/or the use of the formulation (e.g., a lotion, a serum, a gel, a cream, a spray, etc.).

Nonionic Emulsifier(s)

The cosmetic composition typically includes one or more nonionic emulsifier(s), such as polyglyceryl-3 methylglucose distearate. The amount of nonionic emulsifier in the cosmetic composition may vary, but is typically in an amount from about 0.1 to about 10 wt. %, based on the total weight of the cosmetic composition. For example, the amount of nonionic emulsifier in the cosmetic composition may be about 0.1 to about 10 wt. %, about 0.1 to about 8 wt. %, about 0.1 to about 6 wt. %, about 0.1 to about 5 wt. %, about 0.1 to about 4 wt. %, about 0.1 to about 3 wt. %, about 0.1 to about 2 wt. %, about 0.1 to about 1 wt. %; about 0.25 to about 10 wt. %, about 0.25 to about 8 wt. %, about 0.25 to about 6 wt. %, about 0.25 to about 5 wt. %, about 0.25 to about 4 wt. %, about 0.25 to about 3 wt. %, about 0.25 to about 2 wt. %, about 0.25 to about 1 wt. %; about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %, about 0.5 to about 1 wt. %; about 0.75 to about 10 wt. %, about 0.75 to about 8 wt. %, about 0.75 to about 6 wt. %, about 0.75 to about 5 wt. %, about 0.75 to about 4 wt. %, about 0.75 to about 3 wt. %, about 0.75 to about 2 wt. %; about 1 to about 10 wt. % about 1 to about 8 wt. %, about 1 to about 6 wt. %, about 1 to about 5 wt. %, about 1 to about 4 wt. %, about 1 to about 3 wt. %, or about 1 to about 2 wt. %, including ranges and subranges therebetween, based on the total weight of the cosmetic composition.

The nonionic emulsifier may consist of polyglyceryl-3 methylglucose distearate, such that the amount of polyglyceryl-3 methylglucose distearate is the total amount of nonionic emulsifier in the cosmetic composition. Thus, polyglyceryl-3 methylglucose distearate may be present in the cosmetic composition in any of the above listed amounts relating to nonionic emulsifier. In some cases, however, the cosmetic composition includes one or more nonionic emulsifier in addition to polyglyceryl-3 methylglucose distearate.

Emulsifiers are, typically, used to incorporate the oil and/or fatty compounds into a hydrophilic medium, such as an aqueous medium, to form oil-in-water emulsions. In some instances, however, the emulsifiers may be used to incorporate a hydrophilic phase (e.g., aqueous medium) into an oil or fatty phase to form a water-in-oil emulsion. The cosmetic compositions includes one or more nonionic emulsifiers. Additional emulsifiers, however, can also be included (or excluded), such as amphoteric, anionic, and/or cationic emulsifiers.

For O/W emulsions, examples of emulsifiers that may be mentioned include nonionic emulsifiers such as oxyalkylenated (more particularly polyoxyethylenated) fatty acid esters of glycerol; oxyalkylenated fatty acid esters of sorbitan; oxyalkylenated (oxyethylenated and/or oxypropylenated) fatty acid esters; oxyalkylenated (oxyethylenated and/or oxypropylenated) fatty alcohol ethers; sugar esters such as sucrose stearate; and mixtures thereof. A more exhaustive but non-limiting list of useful nonionic emulsifiers is provided later, under the heading "Nonionic Emulsifiers."

In some cases, the cosmetic compositions containing natural oils include two or more nonionic emulsifiers. In particular, one or more nonionic emulsifier having an HLB of 10 or higher and one or more nonionic emulsifiers having an HLB of 5 or less. The total amount of these emulsifiers can be such that the final HLB of the hair-treatment composition is within +/−0.5 of the HLB of the natural oil in the cosmetic composition. This typically results in the final HLB of the emulsified natural oil in the hair-treatment composition ranging from about 6 to about 8.

Examples of emulsifiers that may be mentioned include nonionic emulsifiers such as oxyalkylenated (more particularly polyoxyethylenated) fatty acid esters of glycerol; oxyalkylenated fatty acid esters of sorbitan; oxyalkylenated (oxyethylenated and/or oxypropylenated) fatty acid esters; oxyalkylenated (oxyethylenated and/or oxypropylenated) fatty alcohol ethers; sugar esters such as sucrose stearate; and mixtures thereof.

Non-limiting examples of nonionic emulsifiers include polyglyeryl-based emulsifiers, polyol esters, glycerol ethers, oxyethylenated ethers, oxypropylenated ethers, ethylene glycol polymers, sorbitan esters, polysorbate, and mixtures thereof. In some instances, the one or more nonionic emulsifier selected from polyglyceryl 10-stearate, polyglyceryl-3-caprate, polyglyceryl-3-diisostearate, polyglyceryl-3 methylglucose distearate, or mixtures thereof. In at least one case, in addition to the polyglyceryl-3 methylglucose distearate, the cosmetic composition may further include at least one of polyglyceryl 10-stearate, polyglyceryl-3-caprate, polyglyceryl-3-diisostearate, or polysorbate 20.

Sodium Polyacrylate(s)

The cosmetic composition includes sodium polyacrylate, typically, in an amount of about 0.1 to about 10 wt. %, based on the total weight of the cosmetic composition. For example, the amount of sodium polyacrylate present in the cosmetic composition may be from about 0.1 to about 10 wt. %, about 0.1 to about 8 wt. %, about 0.1 to about 6 wt. %, about 0.1 to about 5 wt. %, about 0.1 to about 4 wt. %, about 0.1 to about 3 wt. %, about 0.1 to about 2 wt. %, about 0.1 to about 1 wt. %; about 0.3 to about 10 wt. %, about 0.3 to about 8 wt. %, about 0.3 to about 6 wt. %, about 0.3 to about 5 wt. %, about 0.3 to about 4 wt. %, about 0.3 to about 3 wt. %, about 0.3 to about 2 wt. %, about 0.3 to about 1 wt. %; about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %, about 0.5 to about 1 wt. %; about 0.75 to about 10 wt. %, about 0.75 to about 8 wt. %, about 0.75 to about 6 wt. %, about 0.75 to about 5 wt. %, about 0.75 to about 4 wt. %, about 0.75 to about 3 wt. %, about 0.75 to about 2 wt. %; about 1 to about 10 wt. %, about 1 to about 8 wt. %, about 1 to about 6 wt. %, about 1 to about 5 wt. %, about 1 to about 4 wt. %, about 1 to about 3 wt. %, about 1 to about 2 wt. %; about 1.25 to about 10 wt. %, about 1.25 to about 8 wt. %, about 1.25 to about 6 wt. %, about 1.25 to about 5 wt. %, about 1.25 to about 4 wt. %, about 1.25 to about 3 wt. %, about 1.25 to about 2 wt. %, including ranges and subranges therebetween, based on the total weight of the cosmetic composition.

Typically, the sodium polyacrylates may be present in the composition in a particulate or non-particulate form. When sodium polyacrylates are present in a particulate form, their mean size in the hydrated state is preferably less than or equal to 10 μm and even more preferentially less than or equal to 5 μm. Their mean size in the non-hydrated state is preferably less than or equal to 2 μm, preferably less than or equal to 1 μm.

Non-limiting examples of commercially available sodium polyacrylates include those sold under the names Octacare® X100, X110 and RM100 by Avecia, those sold under the names Flocare® GB300 and Flosorb® 500 by SNF; those sold under the names Luquasorb® 1003, Luquasorb® 1010, Luquasorb® 1280 and Luquasorb® 1100 by BASF; those sold under the names Water Lock® G400 and G430 (INCI name: Acrylamide/Sodium Acrylate Copolymer) by Grain Processing; those sold under the name Aqua Keep 10 SH NF, Aqua Keep 10 SH NFC, sodium acrylate crosspolymer-2, provided by Sumitomo Seika; and/or those sold under the names Sanfresh® ST-1000, ST100MC and IM-300MC by Sanyo Chemical Industries (INCI name: Sodium Polyacrylate Starch).

Mattifying Agents

The cosmetic composition includes aluminum starch octenylsuccinate in an amount that may vary, but is typically from about 0.1 to about 15 wt. %. For instance, the amount of aluminum starch octenylsuccinate present in the cosmetic composition may be from about 0.1 to about 15 wt. %, about 0.1 to about 12.5 wt. %, about 0.1 to about 10 wt. %, about 0.1 to about 8 wt. %, about 0.1 to about 6 wt. %, about 0.1 to about 5 wt. %, about 0.1 to about 4 wt. %, about 0.1 to about 3 wt. %, about 0.1 to about 2 wt. %; about 0.5 to about 15 wt. %, about 0.5 to about 12.5 wt. %, about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %; about 0.75 to about 15 wt. %, about 0.75 to about 12.5 wt. %, about 0.75 to about 10 wt. %, about 0.75 to about 8 wt. %, about 0.75 to about 6 wt. %, about 0.75 to about 5 wt. %, about 0.75 to about 4 wt. %, about 0.75 to about 3 wt. %, about 0.75 to about 2 wt. %; about 1 to about 15 wt. %, about 1 to about 12.5 wt. %, about 1 to about 10 wt. %, about 1 to about 8 wt. %, about 1 to about 6 wt. %, about 1 to about 5 wt. %, about 1 to about 4 wt. %, about 1 to about 3 wt. %, about 1 to about 2 wt. %; about 1.25 to about 15 wt. %, about 1.25 to about 12.5 wt. %, about 1.25 to about 10 wt. %, about 1.25 to about 8 wt. %, about 1.25 to about 6 wt. %, about 1.25 to about 5 wt. %, about 1.25 to about 4 wt. %, or about 1.25 to about 3 wt. %, including ranges and subranges therebetween, based on the total weight of the cosmetic composition.

Mattifying agents (also referred to as "mattifying fillers") refer to material that gives the complexion more transparency and a hazy effect and provides skin with a natural and desireable appearance, without conferring on it a greasy, gleaming and shiny appearance. To do this, these materials are often absorbent fillers such as talc, silica, kaolin or fillers having light scattering optical properties, which properties are known under the name "soft focus" effect. In addition to reducing the shine or oiliness, mattifying agents can contribute to the overall texture and thickness of a cosmetic composition. Mattifying agents are often (but not always) particulate material or powders.

Cosmetic compositions containing mattifying agents may be characterized by means of the following protocol. The test composition is spread out at a rate of 2 mg/cm$^2$ on a contrast card (Prufkarte type 24/5-250 cm$^2$ sold by the company Erichsen) using a mechanical film spreader. The composition is then dried overnight at a temperature of 37° C. prior to measurement of its reflection using a gonioreflectometer sold by the company Micromodule. The intensity reflected specularly at 30° (R) and scattered at 90° (D) are successively measured. The result obtained is the ratio R between the specular reflection and the diffuse reflection. The value of R is proportionately smaller the greater the mattifying effect afforded by the filler. A value of R of less than or equal to 2 generally indicates a mattifying effect. The mattifying agents according to the instant disclosure include those which, preferably at a content of 5% in a cosmetic composition, give a value of R of less than 1.5 and preferably less than 1.

Suitable mattifying agents include but are not limited to the following: aluminum starch octenylsuccinate, methyl methacrylate crosspolymers, polymethylsilsesquioxane, cellulose, and silica silylate. Non-limiting examples of mattifying agents include: silicas, silicate derivatives, hydrophobic silica aerogel particles, and porous silica microparticles.

Clays include products that are described, for example, in the publication Mineralogie des argiles [Mineralogy of Clays], S. Caillere, S. Henin, M. Rautureau, 2nd Edition 1982, Masson, which is incorporated herein by reference in its entirety. Natural clay is a sedimentary rock in large part composed of specific minerals, silicates, generally, of aluminum. Kaolin is a natural clay. The clays may also be synthetic. Clays can also be chemically modified by various compounds, such as acrylic acids, polysaccharides (for example carboxymethylcellulose) or organic cations. In some instances, the cosmetic compositions of the instant disclosure includes a clay selected from the group consisting of kaolinite, montmorillonites, saponites, laponites, hectorites (including disteardimonium hectorite), and illites.

Silica derivatives that may be mentioned include silica powders, for instance the porous silica microspheres sold under the name SILICA BEADS® SB-700 sold by the company Miyoshi, the products SUNSPHERE® H51, SUNSPHERE® H33 and SUNSPHERE® H53 sold by the company Asahi Glass; the polydimethylsiloxane-coated amorphous silica microspheres sold under the name SA SUNSPHERE® H-33 and SA SUNSPHERE® H-53 sold by the company Asahi Glass; silica microbeads such as those sold under the name SB150 by the company Miyoshi.

In some instances, the cosmetic compositions include one or more mattifying agents selected from the group consisting of methyl methacrylate/glycol dimethacrylate crosspolymer, vinyl dimethicone/methicone silsesquioxane crosspolymer, methyl methacrylate crosspolymer, nylon-12, polyamides, polyethylene, talc, titanium dioxide, silica, clays (such as hectorite clays including disteardimonium hectorite), silicas, polymethysilsequioxane, and a mixture thereof. In at least one case, the cosmetic composition include a mattifying agent comprising aluminum starch octenylsuccinate.

Fatty Compound(s)

The cosmetic compositions include a fatty phase that is a liquid at a temperature of 25° C. or more comprising one or more fatty compounds. Typically, the fatty phase is a liquid at temperatures of 25° C. up to 40° C., such as 30° C. up to 40° C. or 35° C. up to 40° C. The amount of fatty phase (e.g., the total amount of fatty compounds) is typically in the range of about 0.1 to about 20 wt. %, based on the total weight of the cosmetic compositions. In some instances, the amount of fatty phase or total amount of fatty compounds is about 0.1 to 20 wt. %, about 0.1 to about 18 wt. %, about 0.1 to about 16 wt. %, about 0.1 to about 14 wt. %, about 0.1 to about 12 wt. %, about 0.1 to about 10 wt. %, about 0.1 to about 8 wt. %, about 0.1 to about 7 wt. %, about 0.1 to about 6 wt. %, about 0.1 to about 5 wt. %; about 0.5 to 20 wt. %, about 0.5 to about 18 wt. %, about 0.5 to about 16 wt. %, about 0.5 to about 14 wt. %, about 0.5 to about 12 wt. %, about 0.5 to about 10 wt. %, about 0.5 to about 8 wt. %, about 0.5 to about 7 wt. %, about 0.5 to about 6 wt. %, about 0.5 to about 5 wt. %; about 1 to about 20 wt. %, about 1 to about 18 wt. %, about 1 to about 16 wt. %, about 1 to about 14 wt. %, about 1 to about 12 wt. %, about 1 to about 10 wt. %, about 1 to about 8 wt. %, about 1 to about 7 wt. %, about 1 to about 6 wt. %, about 1 to about 5 wt. %; about 2 to about 20 wt. %, about 2 to about 18 wt. %, about 2 to about 16 wt. %, about 2 to about 14 wt. %, about 2 to about 12 wt. %, about 2 to about 10 wt. %, about 2 to about 8 wt. %, about 2 to about 7 wt. %, about 2 to about 6 wt. %, about 2 to about 5 wt. %; about 3 to about 20 wt. %, about 3 to about 18 wt.

%, about 3 to about 16 wt. %, about 3 to about 14 wt. %, about 3 to about 12 wt. %, about 3 to about 10 wt. %, about 3 to about 8 wt. %, about 3 to about 7 wt. %, about 3 to about 6 wt. %, about 3 to about 5 wt. %; about 4 to about 20 wt. %, about 4 to about 18 wt. %, about 4 to about 16 wt. %, about 4 to about 14 wt. %, about 4 to about 12 wt. %, about 4 to about 10 wt. %, about 4 to about 8 wt. % about 4 to about 7 wt. %, about 4 to about 6 wt. %, about 4 to about 5 wt. %; about 5 to about 20 wt. %, about 5 to about 18 wt. %, about 5 to about 16 wt. %, about 5 to about 14 wt. %, about 5 to about 12 wt. %, about 5 to about 10 wt. %, or about 5 to about 8 wt. %, about 5 to about 7 wt. %, or about 5 to about 6 wt. %, including all ranges and sub-ranges therebetween, based on the total weight of the cosmetic composition.

In some instance, the cosmetic compositions may include about 12 wt. % or less of a fatty phase (e.g., the total amount of fatty compounds). For example, the cosmetic composition may include about 12 wt. % or less, about 10 wt. % or less, about 9 wt. % or less, about 8 wt. % or less, about 7 wt. % or less, about 6 wt. % or less, or about 5 wt. % or less of a fatty phase, based on the total weight of the cosmetic composition.

Suitable fatty compounds, if present, include or may be chosen from oils, mineral oil, alkanes (paraffins), fatty alcohols, fatty acids, fatty alcohol derivatives, fatty acid derivatives, esters of fatty alcohols, hydroxy-substituted fatty acids, waxes, triglyceride compounds, lanolin, and a mixture thereof. Preferably, the fatty compound comprises a triglyceride, such as $C_{10}$-$C_{18}$ triglycerides, caprylic/capric triglycerides, or a mixture thereof. In some instances, the fatty compound comprises at least two of triglyceride, isononyl isononanoate, and *Glycine soja* (soybean) oil/*Glycine soja* oil.

Fatty Alcohols

Suitable fatty alcohols, if present, include those having a fatty group with a carbon chain of greater than 8 carbon atoms, 8 to 50 carbon atoms, 8 to 40 carbon atoms, 8 to 30 carbon atoms, 8 to 22 carbon atoms, 12 to 22 carbon atoms, or 12 to 18 carbon atoms, including all ranges and subranges therebetween. In some instances, the fatty group of the fatty alcohols has a carbon chain of 10 to 20 carbon atoms or 10 to 18 carbon atoms. The fatty alcohols may be chosen from polyethylene glycol ethers, such as those having a fatty alcohol group with a carbon chain of 12 to 16 or 12 to 14 carbon atoms.

The fatty alcohol portion is preferably hydrogenated (for example, stearyl, lauryl, cetyl, cetearyl); however, the fatty alcohol may contain one or more double bonds (for example, oleyl). Non-limiting examples of fatty alcohols include decyl alcohol, undecyl alcohol, dodecyl alcohol, myristyl alcohol, lauryl alcohol, cetyl alcohol, stearyl alcohol, cetearyl alcohol (cetyl alcohol and stearyl alcohol), isostearyl alcohol, isocetyl alcohol, behenyl alcohol, linalool, oleyl alcohol, cis-4-t-butylcyclohexanol, isotridecyl alcohol, myricyl alcohol, and a mixture thereof. In some cases, the fatty alcohols comprise at least one of or may be chosen from myristyl alcohol, lauryl alcohol, cetyl alcohol, stearyl alcohol, cetearyl alcohol, isostearyl alcohol, oleyl alcohol, isotridecyl alcohol, and a mixture thereof.

The fatty alcohol may be saturated or unsaturated. Exemplary saturated liquid fatty alcohols may be branched and optionally contain in their structure at least one aromatic or non-aromatic ring. In some instances, however, the fatty alcohols are acyclic. Non-limiting examples of liquid saturated fatty alcohols include octyldodecanol, isostearyl alcohol, and 2-hexyldecanol.

Exemplary unsaturated liquid fatty alcohol may include in their structure at least one double or triple bond. For example, the fatty alcohols may include several double bonds (such as 2 or 3 double bond), which may be conjugated or non-conjugated. The unsaturated fatty alcohols can be linear or branched and may be acyclic or include in their structure at least one aromatic or non-aromatic ring. Liquid unsaturated fatty alcohols may include or be chosen from oleyl alcohol, linoleyl alcohol, linolenyl alcohol and undecylenyl alcohol.

The fatty alcohols may be alkoxylated fatty alcohols, e.g., having about 1 to about 100 moles of an alkylene oxide per mole of alkoxylated fatty alcohol. For example, the alkoxylated fatty alcohols may be alkoxylated with about 1 to about 80 moles, about 2 to about 50, about 5 to about 45 moles, about 10 to about 40 moles, or 15 to about 35 mores, including all ranges and subranges therebetween, of an alkylene oxide per mole of alkoxylated fatty alcohol.

As examples of alkoxylated fatty alcohols, steareth (for example, steareth-2, steareth-20, and steareth-21), laureth (for example, laureth-4, and laureth-12), ceteth (for example, ceteth-10 and ceteth-20) and ceteareth (for example, ceteareth-2, ceteareth-10, and ceteareth-20) are mentioned. In at least one instance, the one or more alkoxylated fatty alcohols include steareth-20. In some instances, the one or more alkoxylated fatty alcohols may be exclusively steareth-20.

Additional fatty alcohol derivatives that may, optionally be suitable include methyl stearyl ether; 2-ethylhexyl dodecyl ether; stearyl acetate; cetyl propionate; the ceteth series of compounds, such as ceteth-1 through ceteth-45, which are ethylene glycol ethers of cetyl alcochol, wherein the numeric designation indicates the number of ethylene glycol moieties present; the steareth series of compounds such as steareth-1 through 10, which are ethylene glycol ethers of steareth alcohol, wherein the numeric designation indicates the number of ethylene glycol moieties present; ceteareth 1 through ceteareth-10, which are the ethylene glycol ethers of ceteareth alcohol, i.e. a mixture of fatty alcohols containing predominantly cetyl and stearyl alcohol, wherein the numeric designation indicates the number of ethylene glycol moieties present; C1-C30 alkyl ethers of the ceteth, steareth, and ceteareth compounds just described; polyoxyethylene ethers of branched alcohols such as octyldodecyl alcohol, dodecylpentadecyl alcohol, hexyldecyl alcohol, and isostearyl alcohol; polyoxyethylene ethers of behenyl alcohol; PPG ethers such as PPG-9-steareth-3, PPG-11 stearyl ether, PPG8-ceteth-1, and PPG-10 cetyl ether; and a mixture thereof.

Fatty acid(s) In some instances, the fatty compounds may be chosen from fatty acids, fatty acid derivatives, esters of fatty acids, hydroxyl-substituted fatty acids, and alkoxylated fatty acids. The fatty acids may be straight or branched chain acids and/or may be saturated or unsaturated. Non-limiting examples of fatty acids include diacids, triacids, and other multiple acids as well as salts of these fatty acids. For example, the fatty acid may optionally include or be chosen from lauric acid, palmitic acid, stearic acid, behenic acid, arichidonic acid, oleic acid, isostearic acid, sebacic acid, and a mixture thereof. In some cases, the fatty acids are selected from the group consisting of palmitic acid, stearic acid, and a mixture thereof.

Non-limiting examples of polyglycerol esters of fatty acids include those of the following formula:

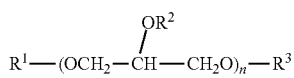

wherein the average value of n is about 3 and $R^1$, $R^2$ and $R^3$ each may independently be a fatty acid moiety or hydrogen, provided that at least one of $R^1$, $R^2$, and $R^3$ is a fatty acid moiety. For instance, $R^1$, $R^2$ and $R^3$ may be saturated or unsaturated, straight or branched, and have a length of $C_1$-$C_{40}$, $C_1$-$C_{30}$, $C_1$-$C_{25}$, or $C_1$-$C_{20}$, $C_1$-$C_{16}$, or $C_1$-$C_{10}$.

The fatty acid derivatives are defined herein to include fatty acid esters of the fatty alcohols as defined above, fatty acid esters of the fatty alcohol derivatives as defined above when such fatty alcohol derivatives have an esterifiable hydroxyl group, fatty acid esters of alcohols other than the fatty alcohols and the fatty alcohol derivatives described above, hydroxy-substituted fatty acids, and a mixture thereof. Non-limiting examples of fatty acid derivatives include ricinoleic acid, glycerol monostearate, 12-hydroxy stearic acid, ethyl stearate, cetyl stearate, cetyl palmitate, polyoxyethylene cetyl ether stearate, polyoxyethylene stearyl ether stearate, polyoxyethylene lauryl ether stearate, ethyleneglycol monostearate, polyoxyethylene monostearate, polyoxyethylene distearate, propyleneglycol monostearate, propyleneglycol distearate, trimethylolpropane distearate, sorbitan stearate, polyglyceryl stearate, dimethyl sebacate, PEG-15 cocoate, PPG-15 stearate, glyceryl monostearate, glyceryl distearate, glyceryl tristearate, PEG-8 laurate, PPG-2 isostearate, PPG-9 laurate, and a mixture thereof. Preferred for use herein are glycerol monostearate, 12-hydroxy stearic acid, and a mixture thereof.

Wax(es)

The fatty compounds may, in some instances, include or be chosen from one or more waxes. Non-limiting examples of waxes in this category include for example, synthetic wax, ceresin, paraffin, ozokerite, polyethylene waxes, illipe butter, beeswax, carnauba, microcrystalline, lanolin, lanolin derivatives, candelilla, cocoa butter, shellac wax, spermaceti, bran wax, capok wax, sugar cane wax, montan wax, whale wax, bayberry wax, acacia decurrents flower wax, vegetable waxes (such as sunflower seed (*Helianthus annuus*), carnauba, candelilla, ouricury or japan wax or cork fibre or sugarcane waxes), or a mixture thereof.

Oil(s)

In some instances, the fatty compounds may include or be chosen from one or more oil(s). The term "oil" means any fatty substance which is in liquid form at room temperature (20-25° C.) and at atmospheric pressure (760 mmHg). Often, at least one of the oils in the cosmetic composition is part of an oily phase.

In some instances, the cosmetic composition includes oils that are plant based or vegetable based oils. The amount of oil and/or plant based or vegetable based oils present in the cosmetic composition may be from about 0.1 to about 10 wt. %, about 0.1 to about 8 wt. %, about 0.1 to about 7 wt. %, about 0.1 to about 6 wt. %, about 0.1 to about 5 wt. %; about 0.5 to about 10 wt. %, about 0.5 to about 8 wt. %, about 0.5 to about 7 wt. %, about 0.5 to about 6 wt. %, about 0.5 to about 5 wt. %; about 1 to about 10 wt. % about 1 to about 8 wt. %, about 1 to about 7 wt. %, about 1 to about 6 wt. %, about 1 to about 5 wt. %; about 2 to about 10 wt. %, about 2 to about 8 wt. %, about 2 to about 7 wt. %, about 2 to about 6 wt. %, about 2 to about 5 wt. %; about 3 to about 10 wt. %, about 3 to about 8 wt. %, about 3 to about 7 wt. %, about 3 to about 6 wt. %, about 3 to about 5 wt. %; about 4 to about 10 wt. %, about 4 to about 8 wt. %, or about 4 to about 7 wt. %, including all ranges and sub-ranges therebetween, based on the total weight of the cosmetic composition.

Additionally and/or alternatively, the cosmetic composition may exclude synthetic oils. In some case, the cosmetic composition may exclude oils other than plant based and vegetable based oils. For example, the amount of synthetic oils and/or oils other than plant based and vegetable based oil may be about 5 wt. % or less, about 4 wt. % or less, about 3 wt. % or less, about 2 wt. % or less, about 1 wt. % or less, or about 0.5 wt. % or less, based on the total weight of the cosmetic composition. In at least one embodiment, the cosmetic composition is free of or essentially free of synthetic oils and/or oils other than plant based and vegetable based oil.

The term "volatile oil" relates to an oil that is capable of evaporating on contact with the skin or a keratin fiber in less than one hour, at room temperature and atmospheric pressure. Volatile oil(s) are liquid at room temperature and have a non-zero vapor pressure, at room temperature and atmospheric pressure, ranging in particular from 0.13 Pa to 40 000 Pa ($10^3$ to 300 mmHg). The term "non-volatile oil" relates to an oil that remains on the skin or the keratin fiber, at room temperature and atmospheric pressure, for at least several hours and which in particular has a vapor pressure of less than 10-3 mmHg (0.13 Pa).

The term "fluoro oil" relates to oil comprising at least one fluorine atom. The term "hydrocarbon-based oil" relates to oil comprising mainly hydrogen and carbon atoms. Hydrocarbon-based oil may be animal hydrocarbon-based oil, plant hydrocarbon-based oil, mineral hydrocarbon-based oil or a synthetic hydrocarbon-based oil. Further, suitable oil may be a mineral hydrocarbon-based oil, a plant hydrocarbon-based oil, or a synthetic hydrocarbon-based oil.

a) Fluoro Oils

The cosmetic compositions described herein may comprise one or more fluoro oils. For example, the one or more fluoro oil may be selected from the group consisting of perfluoromethylcyclopentane, perfluoro-1,3-dimethylcyclohexane, dodecafluoropentane, tetradecafluorohexane, bromoperfluorooctyl, nonafluoromethoxybutane, nonafluoroethoxyisobutane and 4-trifluoromethylperfluoromorpholine. Volatile fluoro oils, such as nonafluoromethoxybutane, decafluoropentane, tetradecafluorohexane, dodecafluoropentane, may also be used.

b) Hydrocarbon-Based Oils

The cosmetic compositions described herein may comprise one or more hydrocarbon-based oils. For example, the hydrocarbon-based oil may be a saturated hydrocarbon, an unsaturated hydrocarbon, lipids, triglycerides, a natural oil, and/or a synthetic oil. In some embodiments, the compositions include a synthetic oil selected from the group consisting of hydrogenated polyisobutene and hydrogenated polydecene.

The hydrocarbon-based oil may be a non-volatile hydrocarbon-based, such as:
  (i) hydrocarbon-based oils of plant origin, such as glyceride triesters, which are generally triesters of fatty acids and of glycerol, the fatty acids of which can have varied chain lengths from $C_4$ to $C_{24}$, it being possible for these chains to be saturated or unsaturated and linear or branched; these oils are in particular wheat germ oil, sunflower oil, grape seed oil, sesame oil, corn oil, apricot oil, castor oil, shea oil, avocado oil, olive oil, soybean oil, sweet almond oil, palm oil, rapeseed oil, cottonseed oil, hazelnut oil, macadamia oil, jojoba oil, alfalfa oil, poppy oil, pumpkin seed oil, marrow oil, blackcurrant oil, evening primrose oil, millet oil, barley oil, quinoa oil, rye oil, safflower oil, candlenut oil, passionflower oil, and musk rose oil.

(ii) synthetic ethers containing from 10 to 40 carbon atoms;

(iii) linear or branched hydrocarbons of mineral or synthetic origin, such as petroleum jelly, polydecenes, hydrogenated polyisobutene such as Parleam, and 4 0 squalane;

(iv) synthetic esters, for instance oils of formula RCOOR' in which R represents a linear or branched fatty acid residue containing from 1 to 40 carbon atoms and R' represents a hydrocarbon-based chain that is especially branched, containing from 1 to 40 carbon atoms on condition that R+R' is ≥10, for instance cetearyl octanoate, isopropyl myristate, isopropyl palmitate, $C_{12}$-$C_{15}$ alkyl benzoate, such as the product sold under the trade name Finsolv TN® or Witconol TN® by Witco or Tegosoft TN® by Evonik Goldschmidt, 2-ethylphenyl benzoate, such as the commercial product sold under the name X-Tend 226® by ISP, isopropyl lanolate, hexyl laurate, diisopropyl adipate, isononyl isononanoate, oleyl erucate, 2-ethylhexyl palmitate, isostearyl isostearate, diisopropyl sebacate, such as the product sold under the name of "Dub Dis™" by Stearinerie Dubois, octanoates, decanoates or ricinoleates of alcohols or polyalcohols, such as propylene glycol dioctanoate; hydroxylated esters, such as isostearyl lactate or diisostearyl malate; and pentaerythritol esters; citrates or tartrates, such as di(linear $C_{12}$-$C_{13}$ alkyl) tartrates, such as those sold under the name Cosmacol ETI® by Enichem Augusta Industriale, and also di(linear $C_{14}$-$C_{15}$ alkyl) tartrates, such as those sold under the name Cosmacol ETL® by the same company; or acetates;

(v) fatty alcohols that are liquid at room temperature, containing a branched and/or unsaturated carbon-based chain containing from 12 to 26 carbon atoms, for instance octyldodecanol, isostearyl alcohol, oleyl alcohol, 2-hexyldecanol, 2-butyloctanol or 2-undecylpentadecanol;

(vi) higher fatty acids, such as oleic acid, linoleic acid or linolenic acid; (vii) carbonates, such as dicaprylyl carbonate, such as the product sold under the name Cetiol CC® by Cognis;

(viii) fatty amides, such as isopropyl N-lauroyl sarcosinate, such as the product sold under the trade name Eldew SL 205® from Ajinomoto; and (ix) essential oils selected from the group consisting of sunflower oil, sesame oil, peppermint oil, macadamia nut oil, tea tree oil, evening primrose oil, sage oil, rosemary oil, coriander oil, thyme oil, pimento berries oil, rose oil, anise oil, balsam oil, bergamot oil, rosewood oil, cedar oil, chamomile oil, sage oil, clary sage oil, clove oil, cypress oil, eucalyptus oil, fennel oil, sea fennel oil, frankincense oil, geranium oil, ginger oil, grapefruit oil, jasmine oil, juniper oil, lavender oil, lemon oil, lemongrass oil, lime oil, mandarin oil, marjoram oil, myrrh oil, neroli oil, orange oil, patchouli oil, pepper oil, black pepper oil, petitgrain oil, pine oil, rose otto oil, rosemary oil, sandalwood oil, spearmint oil, spikenard oil, vetiver oil, wintergreen oil, and ylang ylang.

In certain instances, the non-volatile hydrocarbon-based oils are glyceride triesters and in particular to caprylic/capric acid triglycerides, synthetic esters and in particular isononyl isononanoate, oleyl erucate, $C_{12}$-$C_{15}$ alkyl benzoate, 2-ethylphenyl benzoate and fatty alcohols, such as octyldodecanol.

As volatile hydrocarbon-based oils, mention is made of hydrocarbon-based oils containing from 8 to 16 carbon atoms and in particular of branched $C_8$-$C_{16}$ alkanes, such as $C_8$-$C_{16}$ isoalkanes of petroleum origin (also known as isoparaffins), such as isododecane (also known as 2,2,4,4,6-pentamethylheptane), isodecane or isohexadecane, the oils sold under the Isopar or Permethyl® trade names, branched C $C_8$-$C_{16}$ esters, and isohexyl neopentanoate.

Preferably, the oil is chosen from plant based or vegetable based oils, such as coconut oil, soybean oil, canola oil, rapeseed oil, corn oil, cottonseed oil, olive oil, palm oil, peanut oil, safflower oil, sesame oil, sunflower oil, linseed oil, palm kernel oil, tung oil, jatropha oil, mustard oil, camelina oil, pennycress oil, castor oil, wheatgerm oil, apricot kernel oil, pistachio oil, poppy oil, pine oil, avocado oil, hazel nut oil, grapeseed oil, colza oil, cade oil, peach kernel oil, coffee bean oil, jojoba oil, and a mixture thereof.

Fatty Ester(s)

Non limiting examples of fatty ester(s) include glycerol fatty esters, sorbitan fatty esters, ethoxylated fatty esters, synthetic esters, or the like.

a) Glycerol Fatty Esters

The glycerol fatty esters that can be used as nonionic amphiphilic lipids can be chosen in particular from the group comprising the esters formed from at least one acid comprising a saturated linear alkyl chain having from 16 to 22 carbon atoms, and from 1 to 10 glycerol units. Use may be made of one or more of these glycerol fatty esters in the emulsion of the instant disclosure.

b) Sorbitan Fatty Esters

The sorbitan fatty esters that can be used as nonionic amphiphilic lipids chosen in particular from the group comprising esters of a C16-C22 fatty acid and of sorbitan and oxyethylenated esters of a C16-C22 fatty acid and of sorbitan. They are formed from at least one fatty acid comprising at least one saturated linear alkyl chain, having, respectively, from 16 to 22 carbon atoms, and from sorbitol or from ethoxylated sorbitol. The oxyethylenated esters generally comprise from 1 to 100 ethylene oxide units, and preferably from 2 to 40 ethylene oxide (EO) units.

These esters can be chosen in particular from stearates, behenates, arachidates, palmitates and mixtures thereof. Stearates and palmitates are preferably used.

By way of example of sorbitan fatty ester and of an oxyethylenated sorbitan fatty ester, mention may be made of sorbitan monostearate (CTFA name: sorbitan stearate) sold by the company ICI under the name Span® 60, sorbitan monopalmitate (CTFA name: sorbitan palmitate) sold by the company ICI under the name Span® 40, or sorbitan 20 EO tristearate (CTFA name: polysorbate 65) sold by the company ICI under the name Tween 65®.

c) Ethoxylated Fatty Esters

The ethoxylated fatty esters that can be used as nonionic amphiphilic lipids are esters made up of 1 to 100 ethylene oxide units and of at least one fatty acid chain comprising from 16 to 22 carbon atoms. The fatty chain of the esters can be chosen in particular from stearate, behenate, arachidate and palmitate units, and mixtures thereof. By way of example of ethoxylated fatty esters, mention may be made of the ester of stearic acid comprising 40 ethylene oxide units, such as the product sold under the name Myrj® 52 (CTFA name: PEG-40 stearate) by the company ICI, and the ester of behenic acid comprising 8 ethylene oxide units (CTFA name: PEG-8 behenate), such as the product sold under the name Compritol® HD5 ATO by the company Gattefosse.

d) Synthetic Esters

Synthetic esters, for instance oils of formula RCOOR' in which R represents a linear or branched fatty acid residue containing from 1 to 40 carbon atoms and R' represents a hydrocarbon-based chain that is especially branched, containing from 1 to 40 carbon atoms on condition that R+R' is ≥10, for instance cetearyl octanoate, isopropyl myristate, isopropyl palmitate, C12-C15 alkyl benzoate, such as the product sold under the trade name Finsolv TN® or Witconol TN® by Witco or Tegosoft TN® by Evonik Goldschmidt, 2-ethylphenyl benzoate, such as the commercial product sold under the name X-Tend 226® by ISP, isopropyl lanolate, hexyl laurate, diisopropyl adipate, isononyl isononanoate, oleyl erucate, 2-ethylhexyl palmitate, isostearyl isostearate, diisopropyl sebacate, such as the product sold under the name of "Dub Dis™" by Stearinerie Dubois, octanoates, decanoates or ricinoleates of alcohols or polyalcohols, such as propylene glycol dioctanoate; hydroxylated esters, such as isostearyl lactate or diisostearyl malate; and pentaerythritol esters; citrates or tartrates, such as di(linear C12-C13 alkyl) tartrates, such as those sold under the name Cosmacol ETI® by Enichem Augusta Industriale, and also di(linear C14-C15 alkyl) tartrates, such as those sold under the name Cosmacol ETL® by the same company; or acetates.

Water-Soluble Solvent(s)

The cosmetic compositions may include one or more water-soluble solvents. The amount of water-soluble solvents in the cosmetic composition, if present, may range from about 1 to about 30 wt. %, based on the total weight of the cosmetic composition. For example, the cosmetic composition may include water-soluble solvents in an amount of about 1 to about 30 wt. %, about 1 to about 25 wt. %, about 1 to about 20 wt. %, about 1 to about 18 wt. %, about 1 to about 16 wt. %, about 1 to about 14 wt. %, about 1 to about 12 wt. %, about 1 to about 10 wt. %; about 5 to about 30 wt. %, about 5 to about 25 wt. %, about 5 to about 20 wt. %, about 5 to about 18 wt. %, about 5 to about 16 wt. %, about 5 to about 14 wt. %, about 5 to about 12 wt. %, about 5 to about 10 wt. %; about 10 to about 30 wt. %, about 10 to about 25 wt. %, about 10 to about 20 wt. %, about 10 to about 18 wt. %, about 10 to about 16 wt. %, about 10 to about 14 wt. %; about 12 to about 30 wt. %, about 12 to about 25 wt. %, about 12 to about 20 wt. %, about 12 to about 18 wt. %, about 12 to about 16 wt. %; about 14 to about 30 wt. %, about 14 to about 25 wt. %, about 14 to about 20 wt. %, about 14 to about 18 wt. %; about 16 to about 30 wt. %, about 16 to about 25 wt. %, about 16 to about 20 wt. %; about 18 to about 30 wt. %, about 18 to about 25 wt. %, or about 18 to about 20 wt. %, including ranges and subranges thereof, based on the total weight of the cosmetic composition.

The term "water-soluble solvent" is interchangeable with the term "water-miscible solvent" and means a compound that is liquid at 25° C. and at atmospheric pressure (760 mmHg), and it has a solubility of at least 50% in water under these conditions. In some cases, the water-soluble solvent has a solubility of at least 60%, 70%, 80%, or 90%. Non-limiting examples of water-soluble solvents include, for example, glycerin, alcohols (for example, $C_{1-30}$, $C_{1-15}$, $C_{1-10}$, or $C_{1-4}$ alcohols), organic solvents, polyols (polyhydric alcohols), glycols (e.g., butylene glycol, caprylyl glycol, etc.), and a mixture thereof.

In some cases, the water-soluble solvent is a monoalcohol. Non-limiting examples of monoalcohols include ethanol, propanol, butanol, pentanol, hexanol, isopropyl alcohol, cyclohexanol, isobutyl alcohol, 2-methyl-2-butanol (2-methylbutan-2-ol), and a mixture thereof. In some instances, the monoalcohols comprise or are chosen from ethanol, propanol, butanol, pentanol, an isomer thereof, or a combination thereof. In further instances, the one or more monoalcohol(s) includes or consists of ethanol.

As examples of organic solvents, non-limiting mentions can be made of monoalcohols and polyols such as ethyl alcohol, isopropyl alcohol, propyl alcohol, benzyl alcohol, and phenylethyl alcohol, or glycols or glycol ethers such as, for example, monomethyl, monoethyl and monobutyl ethers of ethylene glycol, propylene glycol or ethers thereof such as, for example, monomethyl ether of propylene glycol, butylene glycol, hexylene glycol, dipropylene glycol as well as alkyl ethers of diethylene glycol, for example monoethyl ether or monobutyl ether of diethylene glycol. The water-soluble solvents may be organic solvents that can be volatile or non-volatile compounds.

Further non-limiting examples of water-soluble solvents include alkanediols such as glycerin, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, (caprylyl glycol), 1,2-hexanediol, 1,2-pentanediol, and 4-methyl-1,2-pentanediol; alkyl alcohols having 1 to 4 carbon atoms such as ethanol, methanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; sorbit, sorbitan, acetine, diacetine, triacetine, sulfolane, and a mixture thereof.

Polyhydric alcohols are useful. The term "polyol" should be understood as meaning, within the meaning of the present disclosure, an organic molecule comprising at least two free hydroxyl groups. The polyols of the cosmetic composition may be glycols or compounds with numerous hydroxyl groups. In some cases, the one or more polyols is/are selected from the group consisting of $C_2$-$C_{32}$ polyols. The one or more polyols may be liquid at ambient temperature (25° C.). The one or more polyols may have from 2 to 32 carbon atoms, from 3 to 16 carbon atoms, or from 3 to 12 carbon atoms.

Non-limiting examples of polyols that may, optionally, be included in the cosmetic composition include and/or may be chosen from alkanediols such as glycerin, 1,2,6-hexanetriol, trimethylolpropane, ethylene glycol, propylene glycol, butylene glycol, pentylene glycol, hexylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, caprylyl glycol, 1,2-hexanediol, 1,2-pentanediol, and 4-methyl-1,2-pentanediol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, sorbitol, sorbitan, triacetin, and a mixture thereof. The one or more polyols may, optionally, be glycols or glycol ethers such as, e.g., monomethyl, monoethyl and monobutyl ethers of ethylene glycol, propylene glycol or ethers thereof such as, e.g., monomethyl ether of propylene glycol, butylene glycol, hexylene glycol, dipropylene glycol as well as alkyl ethers of diethylene glycol, e.g., monoethyl ether or monobutyl ether of diethylene glycol.

In some cases, the polyol comprises glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, and a mixture thereof. Polyol compounds may also be used. Non-limiting examples include the aliphatic diols, such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, and 2-ethyl-1,3-hexanediol, and a mixture thereof.

Thickening Agent(s) Other than Sodium Polyacrylate

The cosmetic compositions described herein may, optionally, include a thickener other than sodium polyacrylate (non-sodium polyacrylate thickening agent). The thickening agent other than sodium polyacrylate may be in an amount of about 0.1 to 20 wt. %, about 0.1 to about 18 wt. %, about 0.1 to about 16 wt. %, about 0.1 to about 14 wt. %, about 0.1 to about 12 wt. %, about 0.1 to about 10 wt. %, about 0.1 to about 8 wt. %, about 0.1 to about 7 wt. %, about 0.1 to about 6 wt. %, about 0.1 to about 5 wt. %; about 0.5 to 20 wt. %, about 0.5 to about 18 wt. %, about 0.5 to about 16 wt. %, about 0.5 to about 14 wt. %, about 0.5 to about 12 wt. %, about 0.5 to about 10 wt. %, about 0.5 to about 8 wt. %, about 0.5 to about 7 wt. %, about 0.5 to about 6 wt. %, about 0.5 to about 5 wt. %; about 1 to about 20 wt. %, about 1 to about 18 wt. %, about 1 to about 16 wt. %, about 1 to about 14 wt. %, about 1 to about 12 wt. %, about 1 to about 10 wt. %, about 1 to about 8 wt. %, about 1 to about 7 wt. %, about 1 to about 6 wt. %, about 1 to about 5 wt. %; about 2 to about 20 wt. %, about 2 to about 18 wt. %, about 2 to about 16 wt. %, about 2 to about 14 wt. %, about 2 to about 12 wt. %, about 2 to about 10 wt. %, about 2 to about 8 wt. %, about 2 to about 7 wt. %, about 2 to about 6 wt. %, about 2 to about 5 wt. %; about 3 to about 20 wt. %, about 3 to about 18 wt. %, about 3 to about 16 wt. %, about 3 to about 14 wt. %, about 3 to about 12 wt. %, about 3 to about 10 wt. %, about 3 to about 8 wt. %, about 3 to about 7 wt. %, about 3 to about 6 wt. %, about 3 to about 5 wt. %; about 4 to about 20 wt. %, about 4 to about 18 wt. %, about 4 to about 16 wt. %, about 4 to about 14 wt. %, about 4 to about 12 wt. %, about 4 to about 10 wt. %, about 4 to about 8 wt. % about 4 to about 7 wt. %, about 4 to about 6 wt. %, about 4 to about 5 wt. %; about 5 to about 20 wt. %, about 5 to about 18 wt. %, about 5 to about 16 wt. %, about 5 to about 14 wt. %, about 5 to about 12 wt. %, about 5 to about 10 wt. %, or about 5 to about 8 wt. %, about 5 to about 7 wt. %, or about 5 to about 6 wt. %, including all ranges and sub-ranges therebetween, based on the total weight of the cosmetic composition.

Many thickening agents are water-soluble, and increase the viscosity of water or form an aqueous gel when the cosmetic composition of the invention is dispersed/dissolved in water. The aqueous solution may be heated and cooled, or neutralized, for forming the gel, if necessary. The thickening agent other than sodium polyacrylate may be dispersed/dissolved in an aqueous solvent that is soluble in water, e.g., ethyl alcohol when it is dispersed/dissolved in water.

Thickening agents may be referred to as "thickeners" or "viscosity modifying agents." Thickening agents are typically included to increase the viscosity of the compositions. Nonetheless, in some instances, certain thickening agents provide additional, surprising benefits to the compositions. Non-limiting examples of thickening agents include polyacrylate crosspolymers (other than sodium polyacrylate) or crosslinked polyacrylate polymers (other than crosslinked sodium polyacrylate), cationic acrylate copolymers, anionic acrylic or carboxylic acid polymers, polyacrylamide polymers, polysaccharides such as cellulose derivatives, gums, polyquaterniums, vinylpyrrolidone homopolymers/copolymers, C8-24 hydroxyl substituted aliphatic acid, C8-24 conjugated aliphatic acid, sugar fatty esters, polyglyceryl esters, and a mixture thereof. Suitable thickeners other than sodium polyacrylate may be found in U.S. patent application Ser. No. 16/731,654, which is incorporated herein, in its entirety for all purposes.

The thickening agents other than sodium polyacrylate may be chosen from xanthan gum, guar gum, biosaccharide gum, cellulose, acacia *seneca* gum, *Sclerotium* gum, agarose, pectin, gellan gum, hyaluronic acid. Additionally, the thickening agents other than sodium polyacrylate may include polymeric thickeners selected from the group consisting of ammonium polyacryloyldimethyl taurate, ammonium acryloyldimethyltaurate/VP copolymer, acrylates copolymers, polyacrylamide, carbomer, and acrylates/C10-30 alkyl acrylate crosspolymer, acrylates/beheneth-25 methacrylate copolymer, and a mixture thereof. Particular types of thickening agents that may be mentioned include the following:

Carboxylic Acid or Carboxylate Based Homopolymer or Co-Polymer, which can be Linear or Crosslinked:

These polymers contain one or more monomers derived from acrylic acid, substituted acrylic acids, and salts and esters of these acrylic acids (acrylates) and the substituted acrylic acids. Commercially available polymers include those sold under the trade names CARBOPOL®, ACRYSOL®, POLYGEL®, SOKALAN®, CARBOPOL ULTREZ®, and POLYGEL®. Examples of commercially available carboxylic acid polymers include the carbomers, which are homopolymers of acrylic acid crosslinked with allyl ethers of sucrose or pentaerytritol. The carbomers are available as the CARBOPOL®900 series from B.F. Goodrich (e.g., CARBOPOL® 954). In addition, other suitable carboxylic acid polymeric agents include ULTREZ® 10 (B.F. Goodrich) and copolymers of C10-30 alkyl acrylates with one or more monomers of acrylic acid, methacrylic acid, or one of their short chain (i.e., C1-4 alcohol) esters, wherein the crosslinking agent is an allyl ether of sucrose or pentaerytritol. These copolymers are known as acrylates/C10-$C_{30}$ alkyl acrylate crosspolymers and are commercially available as CARBOPOL®1342, CARBOPOL®1382, PEMULEN® TR-1, and PEMULEN® TR-2, from B.F. Goodrich.

Other suitable carboxylic acid or carboxylate polymeric agents include copolymers of acrylic acid and alkyl $C_5$-$C_{10}$ acrylate, copolymers of acrylic acid and maleic anhydride, and polyacrylate crosspolymer-6. Polyacrylate Crosspolymer-6 is available in the raw material known as SEPIMAX ZEN from Seppic.

Another suitable carboxylic acid or carboxylate polymeric agent includes acrylamidopropyltrimonium chloride/acrylates copolymer, a cationic acrylates copolymer (or a quaternary ammonium compound), available as a raw material known under the tradename of SIMULQUAT HC 305 from Seppic.

In certain embodiments, the carboxylic acid or carboxylate polymer thickeners useful herein are those selected from carbomers, acrylates/$C10$-$C_{30}$ alkyl acrylate crosspolymers, polyacrylate crosspolymer-6, acrylamidopropyltrimonium chloride/acrylates copolymer, and mixtures thereof.

Celluloses

Non-limiting examples of celluloses include cellulose, carboxymethyl hydroxyethylcellulose, cellulose acetate propionate carboxylate, hydroxyethylcellulose, hydroxyethyl ethylcellulose, hydroxypropylcellulose, hydroxypropyl methylcellulose, methyl hydroxyethylcellulose, microcrystalline cellulose, sodium cellulose sulfate, and mixtures thereof. In some instances, the cellulose is selected from water-soluble cellulose derivatives (for example, carboxymethyl cellulose, methyl cellulose, methylhydroxypropyl cellulose, hydroxyethyl cellulose, hydroxypropyl cellulose, cellulose sulfate sodium salt). Furthermore, in some instance, the cellulose is preferably hydroxypropylcellulose (HPC). In some instances, the cosmetic compositions include one or more cellulose thickeners (e.g., microcrystalline cellulose, carboxymethylcellulose, hydroxymethylcellulose, and hydroxypropylcellulose).

Polyvinylpyrrolidone (PVP) and Co-Polymers

Non-limiting examples include Polyvinylpyrrolidone (PVP), Polyvinylpyrrolidone(PVP)/vinyl acetate copolymer (PVP/VA copolymer), polyvinylpyrrolidone (PVP)/eicosene copolymer, PVP/hexadecene copolymer, etc.

Commercially available polyvinylpyrrolidone includes LUVISKOL K30, K85, K90 available from BASF. Commercially available copolymers of vinylpyrrolidone and vinylacetate include LUVISKOL VA37, VA64 available from BASF; copolymers of vinylpyrrolidone, methacrylamide, and vinylimidazole (INCI: VP/Methacrylamide/Vinyl Imidazole Copolymer) is commercially available as LUVISET from BASF. In some instances, PVP and PVP/VA copolymer are preferred.

Sucrose Esters

Non-limiting examples include sucrose palmitate, sucrose cocoate, sucrose monooctanoate, sucrose monodecanoate, sucrose mono- or dilaurate, sucrose monomyristate, sucrose mono- or dipalmitate, sucrose mono- and distearate, sucrose mono-, di- or trioleate, sucrose mono- or dilinoleate, sucrose pentaoleate, sucrose hexaoleate, sucrose heptaoleate or sucrose octooleate, and mixed esters, such as sucrose palmitate/stearate, and mixtures thereof.

Polyglyceryl Esters

Non-limiting polyglycerol esters of fatty acids (polyglyceryl esters) include those of the following formula:

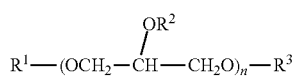

wherein n is from 2 to 20 or from 2 to 10 or from 2 to 5, or is 2, 3, 4, 5, 6, 7, 8, 9, or 10, and $R^1$, $R^2$ and $R^3$ each may independently be a fatty acid moiety or hydrogen, provided that at least one of $R^1$, $R^2$, and $R^3$ is a fatty acid moiety. For instance, $R^1$, $R^2$ and $R^3$ may be saturated or unsaturated, straight or branched, and have a length of $C_1$-$C_{40}$, $C_1$-$C_{30}$, $C_1$-$C_{25}$, or $C_1$-$C_{20}$, $C_1$-$C_{16}$, or $C_1$-$C_{10}$. Additionally, non-limiting examples of non-ionic polyglycerol esters of fatty acids include polyglyceryl-4 caprylate/caprate, polyglyceryl-10 caprylate/caprate, polyglyceryl-4 caprate, polyglyceryl-10 caprate, polyglyceryl-4 laurate, polyglyceryl-5 laurate, polyglyceryl-6 laurate, polyglyceryl-10 laurate, polyglyceryl-10 cocoate, polyglyceryl-10 myristate, polyglyceryl-10 oleate, polyglyceryl-10 stearate, and mixtures thereof.

C8-24 hydroxyl substituted aliphatic acid and C8-24 Conjugated Aliphatic Acid

Non-limiting examples include conjugated linoleic acid, cis-parinaric acid, trans-7-octadecenoic acid, cis-5,8,11,14, 17-eicosapentanoic acid, cis-4,7,10,13,16,19-docosahexenoic acid, columbinic acid, linolenelaidic acid, ricinolaidic acid, stearidonic acid, 2-hydroxystearic acid, alpha-linolenic acid, arachidonic acid, cis-11,14-eicosadienoic acid, linolelaidic acid, monopetroselinic acid, petroselinic acid, ricinoleic acid, trans-vaccenic acid, cis-11,14,17-eicosatrienoic acid, cis-5-eicosenoic acid, cis-8,11,14-eicosatrienoic acid, hexadecatrienoic acid, palmitoleic acid, petroselaidic acid, trans farnesol, cis-13,16-docosadienoic acid, cis-vaccenic acid, cis-11-eicosenoic acid, cis-13,16,19-docosatrienoic acid, cis-13-octadecenoic acid, cis-15-octadecanoic acid, cis-7,10,13,16 docosatetraenoic acid, elaidic acid, gamma-linolenic acid, geranic acid, geranyl geranoic acid, linoleic acid, oleic acid, pinolenic acid, trans-13-octadecenoic acid. More preferably, the aliphatic acid comprises 12-hydroxystearic acid, conjugated linoleic acid, or a mixture thereof.

Gums

Non-limiting examples of gums include gum arabic, tragacanth gum, karaya gum, guar gum, gellan gum, tara gum, locust bean gum, tamarind gum, xanthan gum, locust bean gum, *seneca* gum, *Sclerotium* gum, etc.

Skin Active Agent(s)

The cosmetic compositions may, optionally, include one or more skin active agents, such as anti-aging agent, anti-wrinkle actives, anti-oxidants, humectants, moisturizing ingredients, depigmenting agents, and/or agents for treating oily skin etc. The skin active agents may be included in the cosmetic composition in an amount ranging from greater than zero to about to about 20 wt. %, based on the total weight of the composition. For example, the total amount of skin active agents may be from greater than zero to about 20 wt. %, greater than zero to about 15 wt. %, greater than zero to about 10 wt. %, greater than zero to about 9 wt. %, greater than zero to about 8 wt. %, greater than zero to about 7 wt. %, greater than zero to about 6 wt. %, greater than zero to about 5 wt. %, greater than zero to about 4 wt. %, greater than zero to about 3 wt. %, greater than zero to about 2 wt. %; about 10 ppm to about 20 wt. % (200,000 ppm), about 10 ppm to about 15 wt. % (150,000 ppm), about 10 ppm to about 10 wt. % (100,000 ppm), about 10 ppm to about 5 wt. % (50,000 ppm), about 10 ppm to about 2.5 wt. % (25,000 ppm), about 10 ppm to about 1 wt. % (10,000 ppm), about 10 ppm to about 0.5 wt. % (5,000 ppm), about 10 ppm to about 0.3 wt. % (3,000 ppm), about 10 ppm to about 0.2 wt. % (2,000 ppm), about 10 ppm to about 0.1 wt. % (1,000 ppm), about 10 ppm to 500 ppm; about 0.05 to about 20 wt. %, about 0.05 to about 15 wt. %, about 0.05 to about 10 wt.

%, about 0.05 to about 5 wt. %, about 0.05 to about 2.5 wt. %, about 0.05 to about 1 wt. %, about 0.05 to about 0.5 wt. %; about 0.1 to about 20 wt. %, about 0.1 to about 15 wt. %, about 0.1 to about 10 wt. %, about 0.1 to about 5 wt. %, about 0.1 to about 2.5 wt. %, about 0.1 to about 1 wt. %, about 0.1 to about 0.5 wt. %; about 1 to about 20 wt. %, about 1 to about 15 wt. %, about 1 to about 10 wt. %, about 1 to about 8 wt. %, about 1 to about 6 wt. %, about 1 to about 5 wt. %, about 1 to about 4 wt. %, about 1 to about 3 wt. %; about 2 to about 20 wt. %, about 2 to about 15 wt. %, about 2 to about 10 wt. %, about 2 to about 8 wt. %, about 2 to about 6 wt. %, about 2 to about 5 wt. %, about 2 to about 4 wt. %; about 3 to about 20 wt. %, about 3 to about 15 wt. %, about 3 to about 10 wt. %, about 3 to about 8 wt. %, about 3 to about 6 wt. %, about 3 to about 5 wt. %; about 4 to about 20 wt. %, about 4 to about 15 wt. %, about 4 to about 10 wt. %, about 4 to about 8 wt. %, or about 4 to about 6 wt. %, including ranges and subranges therebetween, based on the total weight of the cosmetic composition.

A non-limiting discussion of skin active agents that may, in some cases, be included in the cosmetic composition is provided below:

Humectants and/or Moisturizing Ingredients

Examples of humectants and/or moisturizing ingredients include glycerol and its derivatives, urea and its derivatives, especially Hydrovance marketed by National Starch, hyaluronic acid, sodium pidolate, xylitol, serine, ectoin and its derivatives, collagen, plankton, an extract of *Imperata cylindra* sold under the name Moist™ 24 by Sederma, homopolymers of acrylic acid as Lipidure-HM of NOF Corporation, beta-glucan and in particular sodium carboxymethyl beta-glucan Mibelle-AG-Biochemistry, a mixture of oils passionflower, apricot, corn, and rice bran sold by Nestle under the name NutraLipids®, a C-glycoside derivatives, in particular the C-13-D-xylopyranoside-2-hydroxypropane in the form of a solution at 30% by weight of active material in a water/propylene glycol mixture (60/40 wt %) as the product produced by the company Chimex under the trade name "Mexoryl SBB", a rose hip oil marketed by Nestle, a micro-algae extract *Prophyridium cruentum* enriched with zinc, marketed under the name by Vincience Algualane Zinc spheres of collagen and chondroitin sulfate of marine origin (Atelocollagen) sold by the company Engelhard Lyon under the name Marine Filling Spheres®, hyaluronic acid spheres such as those marketed by Engelhard Lyon, and arginine.

Depigmenting Agents

Depigmenting agents that may be incorporated in the cosmetic composition include those chosen from alpha and beta arbutin, ferulic acid, lucinol and its derivatives, kojic acid, resorcinol and derivatives thereof, tranexamic acid and derivatives thereof, gentisic acid, homogentisic, methyl gentisate or homogentisate, dioic acid, lipoic acid, ellagic acid, vitamin B3, linoleic acid and its derivatives, certain compounds derived from plants such as chamomile, bearberry, the aloe family (vera, *ferox*, bardensis), mulberry, skullcap, a water kiwi fruit (*Actinidia chinensis*) marketed by Gattefosse, an extract of *Paeonia suffruticosa* root, such as that sold by Ichimaru Pharcos under the name Liquid Botanpi Be® an extract of brown sugar (*Saccharum officinarum*) such as molasses extract marketed by Taiyo Kagaku under the name Liquid Molasses, without this list being exhaustive. Particular depigmenting agents include alpha and beta arbutin, ferulic acid, kojic acid, resorcinol and derivatives, D pantheteine calcium sulfonate, lipoic acid, ellagic acid, vitamin B3, a water kiwi fruit (*Actinidia chinensis*) marketed by Gattefosse, an extract of *Paeonia suffruticosa* root, such as that sold by the company Ichimaru Pharcos under the name Botanpi Liquid B®.

Anti-Wrinkle Active

The cosmetic composition may include one or more anti-wrinkle actives. The term "anti-wrinkle active" refers to a natural or synthetic compound producing a biological effect, such as the increased synthesis and/or activity of certain enzymes, when brought into contact with an area of wrinkled skin, this has the effect of reducing the appearance of wrinkles and/or fine lines. Exemplary anti-wrinkle actives may be chosen from: desquamating agents, anti-glycation agents, inhibitors of NO-synthase, agents stimulating the synthesis of dermal or epidermal macromolecules and/or preventing their degradation, agents for stimulating the proliferation of fibroblasts and/or keratinocytes, or for stimulating keratinocyte differentiation reducing agents; muscle relaxants and/or dermo-decontracting agents, anti-free radical agents, and mixtures thereof. Examples of such compounds are: adenosine and its derivatives and retinoids (such as, retinol palmitate and retinol), ascorbic acid and its derivatives such as magnesium ascorbyl phosphate and ascorbyl glucoside; nicotinic acid and its precursors such as nicotinamide; ubiquinone; glutathione and precursors thereof such as L-2-oxothiazolidine-4-carboxylic acid, the compounds C-glycosides and their derivatives as described in particular in EP-1345919, in particular C-beta-D-xylopyranoside-2-hydroxy-propane as described in particular in EP-1345919, plant extracts including sea fennel and extracts of olive leaves, as well as plant and hydrolysates thereof such as rice protein hydrolysates or soybean proteins; algal extracts and in particular *laminaria*, bacterial extracts, the sapogenins such as diosgenin and extracts of *Dioscorea* plants, in particular wild yam, comprising: the a-hydroxy acids, f3-hydroxy acids, such as salicylic acid and n-octanoyl-5-salicylic oligopeptides and pseudodipeptides and acyl derivatives thereof, in particular acid {2-[acetyl-(3-trifluoromethyl-phenyl)-amino]-3-methyl-}acetic acid and lipopeptides marketed by the company under the trade names SEDERMA Matrixyl 500 and Matrixyl 3000; lycopene, manganese salts and magnesium salts, especially gluconates, and mixtures thereof. In at least one case, the cosmetic composition includes adenosine derivatives, such as non-phosphate derivatives of adenosine, such as in particular the 2'-deoxyadenosine, 2',3'-adenosine isopropoylidene; the toyocamycine, 1-methyladenosine, N-6-methyladenosine; adenosine N-oxide, 6-methylmercaptopurine riboside, and the 6-chloropurine riboside. Other derivatives include adenosine receptor agonists such as adenosine phenylisopropyl ("PIA"), 1-methylisoguanosine, N6-cyclohexyladenosine (CHA), N6-cyclopentyladenosine (CPA), 2-chloro-N6-cyclopentyladenosine, 2-chloroadenosine, N6-phenyladenosine, 2-phenylaminoadenosine, MECA, N 6-phenethyladenosine, 2-p-(2-carboxy-ethyl) phenethyl-amino-5'-N-ethylcarboxamido adenosine (CGS-21680), N-ethylcarboxamido-adenosine (NECA), the 5'(N-cyclopropyl)-carboxamidoadenosine, DPMA (PD 129.944) and metrifudil.

Skin Active Agent for Oily Skin

The cosmetic composition may, optionally, include a skin active agent that addresses oily skin. These agents can be sebo-regulating or antiseborrhoeic agents capable of regulating the activity of sebaceous glands. Exemplary skin active agents for addressing oily skin include: retinoic acid, retinol, benzoyl peroxide, sulfur, vitamin B6 (pyridoxine or) chloride, selenium, samphire—the cinnamon extract blends, tea and octanoylglycine such as—15 Sepicontrol A5 TEA from Seppic—the mixture of cinnamon, sarcosine and octanoylglycine marketed especially by Seppic under the trade name Sepicontrol A5—zinc salts such as zinc gluconate, zinc pyrrolidonecarboxylate (or zinc pidolate), zinc lactate, zinc aspartate, zinc carboxylate, zinc salicylate 20, zinc cysteate;—derivatives particularly copper and copper pidolate as Cuivridone Solabia—extracts from plants of *Arnica montana, Cinchona succirubra, Eugenia caryophyllata, Humulus lupulus, Hypericum perforatum, Mentha pipenta* 25 *Rosmarinus officinalis, Salvia officinalis* and *Thymus vulgaris*, all marketed for example by Maruzen— extracts of meadowsweet (*Spiraea ulmaria*), such as that sold under the name Sebonormine® by Silab—extracts of the alga *Laminaria saccharina*, such as that sold under the 30 name Phlorogine® by Biotechmarine—the root extracts of burnet mixtures (Sanguisorba officinalis/Poterium officinale), rhizomes of ginger (*Zingiber officinalis*) and cinnamon bark (*Cinnamomum cassia*), such as that sold under the name Sebustop® by Solabia—extracts of flaxseed such as that sold under the name Linumine® by Lucas Meyer— Phellodendron extracts such as those sold under the name Phellodendron® extract BG by Maruzen or Oubaku liquid B by Ichimaru Pharcos—of argan oil mixtures extract of *Serenoa serrulata* (saw palmetto) extract and sesame seeds such as that sold under the name Regu® SEB by Pentapharm—mixtures of extracts of willowherb, of Terminalia chebula, nasturtium and of bioavailable zinc (microalgae), such as that sold under the name Seborilys Green Tech®;— extracts of *Pygeum afrianum* such as that sold under the name *Pygeum afrianum* sterolic lipid extract by Euromed— extracts of *Serenoa serrulata* such as those sold under the name Viapure *Sabal®* by Actives International, and those sold by the company Euromed—of extracts of plantain blends, *Berberis aquifolium* and sodium salicylate 20 such as that sold under the name Seboclear Rahn—extract of clove as that sold under the name Clove extract powder by Maruzen—argan oil such as that sold under the name Lipofructyl Laboratories Serobiologiques; 25—lactic protein filtrates, such as that sold under the name Normaseb® by Sederma—the seaweed *laminaria* extracts, such as that sold under the name Laminarghane® by Biotechmarine— oligosaccharides seaweed *Laminaria digitata*, such as that sold under the name Phycosaccharide 30 AC by the company Codif—extracts of sugar cane such as that sold under the name Policosanol® by the company Sabinsa, the sulfonated shale oil, such as that sold under the name Ichtyol Pale by Ichthyol—extracts of meadowsweet (*Spiraea ulmaria*) such as that sold under the name Cytobiol Ulmaire® by societeLibiol—sebacic acid, especially sold in the form of a sodium polyacrylate gel under the name Sebosoft® by Sederma—glucomannans extracted from konjac tuber and modified with alkylsulfonate chains such as that sold under the name Biopol Beta by Arch Chemical—extracts of *Sophora angustifolia*, such as those sold under the name *Sophora* powder or *Sophora* extract by Bioland—extracts of *Cinchona* bark *succirubra* such as that sold under the name Red Bark HS® by Alban Muller—extracts of Quillaja *saponaria* such as that sold under the name 15 Panama wood HS by Alban Muller—*Glycine* grafted onto an undecylenic chain, such as that sold under the name Lipacide® UG OR by SEPPIC—the mixture of oleanolic acid and nordihydroguaiaretic acid, such as that sold under the form of a gel under the name AC. Net by Sederma; 20—phthalimidoperoxyhexanoic acid—citrate tri (C12-C13) sold under the name COSMACOL™ ECI by Sasol; trialkyl citrate (C14-C15) sold under the name COSMACOL™ ECL by Sasol— 10-hydroxydecanoic acid, including mixtures acid-hydroxy-decanoic October 25, sebacic acid and 1,10-decandiol such as that sold under the name Acnacidol® BG by Vincience and mixtures thereof.

Antioxidants

Vitamin C and derivatives may be used, including ascorbic acid, sodium ascorbate, and the fat soluble esters tetrahexyldecyl ascorbate and ascorbyl palmitate, magnesium ascorbyl phosphate, ascorbyl-glucoside, glucosamine ascorbate, ascorbyl acetate, etc. Additionally, extracts from plants containing a high amount of vitamin C such as camu berry (Myrciaria *dubia*), acerola, emblica *officinalis*, and bioflavonoids from rose hip and citrus may be used including watersoluble bioflavonoids such as hesperidin methyl chalcone may also be used.

Sesame (*Sesamum indicum*) or sesame lignan may also be added. Sesame and its lignans (the fibrous compounds associated with the sesame) act as antioxidants. Sesame seed lignans significantly enhance vitamin E activity.

Other antioxidants include tocopherols (e.g. d-α-tocopherol, d-β-tocopherol, d-γ-tocopherol, d-delta-tocopherol), tocotrienols (e.g. d-α-tocotrienol, d-β-tocotrienol, d-γ.-tocotrienol, d-delta-tocotrienol,) and vitamin E (α-tocopherol acetate). These compounds may be isolated from natural sources, prepared by synthetic means, or mixtures thereof. Tocotrienol-enriched vitamin E preparations may be obtained by fractionating vitamin E preparations to remove a portion of tocopherols and recover a preparation more highly concentrated in tocotrienol. Useful tocotrienols are natural products isolated, for example, from wheat germ oil, grain, or palm oil using high performance liquid chromatography, or isolated by alcohol extraction and/or molecular distillation from barley, brewer's grain or oats. As used herein, the term "tocotrienols" includes tocotrienol-rich-fractions obtained from these natural products as well as the pure compounds. The increased glutathione peroxidase activity protects the skin from oxidative damage.

In addition, carotenoids, particularly the xanthophyll type, are also useful antioxidants that can be used. The xanthopyll type carotenoids include molecules, such as lutein, canthaxantin, cryptoxanthin, zeaxanthin and astaxanthin. Xanthophylls protect compounds, such as vitamin A, vitamin E, and other carotenoids.

Flavonoids

The active agent may be an antioxidant selected from the group of flavonoids. In some instances, the flavonoid is a flavanone (derivative of 2,3-dihydro-2-phenylchromen-4-one). Flavones include: Butin, Eriodictyol, Hesperetin, Hesperidin, Homoeriodictyol, Isosakuranetin, Naringenin, Naringin, Pinocembrin, Poncirin, Sakuranetin, Sakuranin, and Sterubin. The flavonoid may be a flavanonol (derivative of 3-hydroxy-2,3-dihydro-2-phenylchromen-4-one). Flavanols include: Taxifolin, Aromadedrin, Chrysandroside A, Chrysandroside B, Xeractinol, Astilbin, and Fustin. The flavonoid may be a flavone (derivative of 2-phenylchromen-4-one). Flavones include: Apigenin, Luteolin, Tangeritin, Chrysin, Baicalein, Scutellarein, Wogonin, Synthetic Flavones: Diosmin, and Flavoxate. The flavonoid may be a flavonol (derivative of 3-hydroxy-2-phenylchromen-4-one). Flavonols include: 3-Hydroxyflavone, Azaleatin, Fisetin, Galangin, Gossypetin, Kaempferide, Kaempferol, Isorhamnetin, Morin, Myricetin, Natsudaidain, Pachypodol, Quercetin, Rhamnazin, Rhamnetin, Azalein, Hyperoside, Isoquercitin, Kaempferitrin, Myricitrin, Quercitrin, Robinin, Rutin, Spiraeoside, Xanthorhamnin, Amurensin, Icariin, and Troxerutin. The flavonoid may be a flavan-3-ol (derivatives of 2-phenyl-3,4-dihydro-2H-chromen-3-ol). Flavan-3-ols include: Catechin, Epicatechin, Epigallocatechin, Epicatechin gallate, Epigallocatechin gallate, Epiafzelechin, Fisetinidol, Guibourtinidol, Mesquitol, and Robinetinidol. The flavonoid may be a flavan-4-ol (derivative of 2-phenylchroman-4-ol). Flavan-4-ols include: Apiforol and Luteoforol. The flavonoid may be an isoflavone (derivative of 3-phenylchromen-4-one). Isoflavones include: Genistein, Daidzein, Biochanin A, Formononetin, and the Equol metabolite from Daidzein.

The antioxidant may be an anthocyanidin (derivative of 2-phenylchromenylium cation). Anthocyanidins include: Aurantinidin, Cyanidin, Delphinidin, Europinidin, Luteolinidin, Pelargonidin, Malvidin, Peonidin, Petunidin, Rosinidin, and Xanthone.

The antioxidant may be a Dihydrochalcone (derivative of 1,3-diphenyl-1-propanone). Dihydrochalcones include: Phloretin, Dihydrochalcone phloretin Phlorizin, Aspalathin, Naringin dihydrochalcone, Neohesperidin dihydrochalcone, and Nothofagin. Without limiting the mode of action of the invention, dihydrochalcones may exert an antioxidant effect by reducing reactive free radicals, like reactive oxygen and reactive nitrogen species.

The antioxidant may be an anthocyanin. Anthocyanins and their derivatives are antioxidants. Anthocyanins encompasses a class of flavonoid compounds that are naturally occurring, water-soluble compounds, responsible for the red, purple, and blue colors of many fruits, vegetables, cereal grains, and flowers. Additionally, anthocyanins are collagenase inhibitors. The inhibition of collagenase helps in the prevention and reduction of wrinkles, increase in skin elasticity, etc., which are caused by a reduction in skin collagen. The anthocyanins may be obtained from any portion of various plant sources, such as the fruit, flower, stem, leaves, root, bark, or seeds. One of skill in the art will understand that certain portions of the plant may contain higher natural levels of anthocyanins, and, therefore, those portions are used to obtain the desired anthocyanins. In some instances, antioxidants may include one or more betacyanin. Betacyanins, like anthocyanins, may be obtained from natural sources and are antioxidants.

The antioxidant may be a Phenylpropanoid (derivatives of cinnamic acid). Phenylpropanoids include: Cinnamic acid, Caffeic acid, Ferulic acid, Trans-ferulic acid (including its antioxidant pharmacore 2,6-dihydroxyacetophenome), 5-Hydroxyferulic acid, Sinapic acid, Coumaryl alcohol, Coniferyl alcohol, Sinapyl alcohol, Eugenol, Chavicol, Safrole, P-coumaric acid, and Sinapinic acid. Without limiting the mode of action of the invention, Phenylpropanoids may neutralize free radicals.

The antioxidant may be a Chalcone (derivative of 1,3-diphenyl-2-propen-1-one). Chalcones include: Butein, Okanin, Carthamin, Marein, Sophoradin, Xanthohumol, Flavokvain A, Flavokavain B, Flavokavin C, and synthetic Safalcone.

The antioxidant may be a Curcuminoid. Curcuminoids include: Curcumin, Desmethoxycurcumin, bis-Desmethoxycurcumin, Tetrahydrocurcumin, and Tetrahydrocurcuminoids. Curcumin and tetrahydrocurcuminoids may be derived from rhizomes of *Curcuma longa*. Tetrahydrocurcumin, a metabolite of curcumin, has been found to be a more potent antioxidant and more stable compared to curcumin.

The antioxidant may be a Tannin. Tannins include: Tannin, Terflavin B, Glucogallin, Dgallic acid, and Quercitannic acid.

The antioxidant may be a stilbenoid. Stilbenoids include: Resveratrol, Pterostilbene, and Piceatannol. Resveratrol may include, but is not limited to, 3,5,4'-trihydroxystilbene, 3,4,3',5'-tetrahydroxystilbene (piceatannol), 2,3',4,5'-tetrahydroxystilbene (oxyresveratrol), 4,4'-dihydroxystilbene, and alpha and beta glucoside, galactoside and mannoside derivatives thereof.

The antioxidant may be a Coumarin (derivatives of 2H-chromen-2-one). Coumarins include: 4-Hydroxycoumarin, Umbelliferone, Aesculetin, Herniarin, Auraptene, and Dicoumarol.

The antioxidant may be a Carotenoid. Carotenoids include: beta-Carotene, alpha-Carotene, gamma-Carotene, beta-Cryptoxanthin, Lycopene, Lutein, and Idebenone. Sesame (*Sesamum indicum*) or sesame lignan may also be added. Sesame and its lignans (the fibrous compounds associated with the sesame) act as antioxidants. Sesame seed lignans significantly enhance vitamin E activity.

The antioxidant may be: a Xanthone, Butylated Hydroxytoluene, 2,6-Di-tert-butylphenol, 2,4-Dimethyl-6-tert-butylphenol, Gallic acid, Eugenol, Uric acid, alpha-Lipoic acid, Ellagic acid, Chicoric acid, Chlorogenic acid, Rosmarinic acid, Salicylic acid, Acetylcysteine, S-Allyl cysteine, Barbigerone, Chebulagic acid, Edaravone, Ethoxyquin, Glutathione, Hydroxytyrosol, Idebenone, Melatonin, N-Acetylserotonin, Nordihydroguaiaretic acid, Oleocanthal, Oleuropein, Paradol, Piceatannol, Probucol, Propyl gallate, Protocatechuic acid, Pyritinol, Rutin, Secoisolariciresinol diglucoside, Sesamin, Sesamol, Silibinin, Silymarin, Theaflavin, Theaflavin digallate, Thmoquinone, Trolox, Tyrosol, Polyunsaturated fatty acids, and sulfur-based antioxidants such as Methionine or Lipoic acid.

Preservative(s)

Preservatives may be included in the cosmetic composition in an amount typically from about 0.01 to about 20 wt. %, about 0.01 to about 18 wt. %, about 0.01 to about 16 wt. %, about 0.01 to about 14 wt. %, about 0.01 to about 12 wt. %, about 0.01 to about 10 wt. %, about 0.01 to about 8 wt. %, about 0.01 to about 7 wt. %, about 0.01 to about 6 wt. %, about 0.01 to about 5 wt. %; about 0.1 to about 20 wt. %, about 0.1 to about 18 wt. %, about 0.1 to about 16 wt. %, about 0.1 to about 14 wt. %, about 0.1 to about 12 wt. %, about 0.1 to about 10 wt. %, about 0.1 to about 8 wt. %, about 0.1 to about 7 wt. %, about 0.1 to about 6 wt. %, about 0.1 to about 5 wt. %; about 1 to about 20 wt. %, about 1 to about 18 wt. %, about 1 to about 16 wt. %, about 1 to about 14 wt. %, about 1 to about 12 wt. %, about 1 to about 10 wt. %, about 1 to about 8 wt. %, about 1 to about 7 wt. %, about 1 to about 6 wt. %, about 1 to about 5 wt. %; about 4 to about 20 wt. %, about 4 to about 18 wt. %, about 4 to about 16 wt. %, about 4 to about 14 wt. %, about 4 to about 12 wt. %, about 4 to about 10 wt. %, about 4 to about 8 wt. %, or about 4 to about 7 wt. %, including all ranges and sub-ranges therebetween, based on the total weight of the cosmetic composition. Non-limiting examples of preservatives include sodium benzoate, potassium sorbate, phenoxyethanol, salicylic acid, tocopherol, chlorphenesin, BHT, disodium EDTA, pentaerythrityl tetra-di-t-butyl hydroxyhydrocinnamate, and mixtures thereof.

Silicone Oil(s)

The cosmetic composition comprises one or more silicone oils. The amount of silicone oil present in the cosmetic composition may be from about 0.1 to 20 wt. %, about 0.1 to about 18 wt. %, about 0.1 to about 16 wt. %, about 0.1 to about 14 wt. %, about 0.1 to about 12 wt. %, about 0.1 to about 10 wt. %, about 0.1 to about 8 wt. %, about 0.1 to about 7 wt. %, about 0.1 to about 6 wt. %, about 0.1 to about 5 wt. %; about 0.5 to 20 wt. %, about 0.5 to about 18 wt. %, about 0.5 to about 16 wt. %, about 0.5 to about 14 wt. %, about 0.5 to about 12 wt. %, about 0.5 to about 10 wt. %, about 0.5 to about 8 wt. %, about 0.5 to about 7 wt. %, about 0.5 to about 6 wt. %, about 0.5 to about 5 wt. %; about 1 to about 20 wt. %, about 1 to about 18 wt. %, about 1 to about 16 wt. %, about 1 to about 14 wt. %, about 1 to about 12 wt. %, about 1 to about 10 wt. %, about 1 to about 8 wt. %, about 1 to about 7 wt. %, about 1 to about 6 wt. %, about 1 to about 5 wt. %; about 2 to about 20 wt. %, about 2 to about 18 wt. %, about 2 to about 16 wt. %, about 2 to about 14 wt. %, about 2 to about 12 wt. %, about 2 to about 10 wt. %, about 2 to about 8 wt. %, about 2 to about 7 wt. %, about 2 to about 6 wt. %, about 2 to about 5 wt. %; about 3 to about 20 wt. %, about 3 to about 18 wt. %, about 3 to about 16 wt. %, about 3 to about 14 wt. %, about 3 to about 12 wt. %, about 3 to about 10 wt. %, about 3 to about 8 wt. %, about 3 to about 7 wt. %, about 3 to about 6 wt. %, about 3 to about 5 wt. %; about 4 to about 20 wt. %, about 4 to about 18 wt. %, about 4 to about 16 wt. %, about 4 to about 14 wt. %, about 4 to about 12 wt. %, about 4 to about 10 wt. %, about 4 to about 8 wt. % about 4 to about 7 wt. %, about 4 to about 6 wt. %, about 4 to about 5 wt. %; about 5 to about 20 wt. %, about 5 to about 18 wt. %, about 5 to about 16 wt. %, about 5 to about 14 wt. %, about 5 to about 12 wt. %, about 5 to about 10 wt. %, or about 5 to about 8 wt. %, about 5 to about 7 wt. %, or about 5 to about 6 wt. %, including all ranges and sub-ranges therebetween, based on the total weight of the cosmetic composition.

The cosmetic compositions described herein may comprise one or more silicone oils. The term "silicone oil" relates to oil comprising at least one silicon atom, and especially at least one Si—O group. Non-limiting examples of silicone oils include dimethicone, cyclomethicone, polysilicone-11, phenyl trimethicone, trimethylsilylamodimethicone, and stearoxytrimethylsilane. In some cases, the cosmetic composition includes dimethicone, and optionally additional oils, including additional silicone oils. Typically, the one or more silicone oils is a non-volatile silicon oil. In some embodiments, the silicone oil is polydimethylsiloxanes (PDMSs), polydimethylsiloxanes comprising alkyl or alkoxy groups which are pendent and/or at the end of the silicone chain, which groups each contain from 2 to 24 carbon atoms, or phenyl silicones, such as phenyl trimethicones, phenyl dimethicones, phenyl(trimethylsiloxy)diphenylsiloxanes, diphenyl dimethicones, diphenyl(methyldiphenyl)trisiloxanes or (2-phenylethyl)trimethylsiloxysilicates.

Other examples of silicone oils that may be mentioned include volatile linear or cyclic silicone oils, especially those with a viscosity 8 centistokes ($8 \times 10^6$ m$^2$/s) and especially containing from 2 to 7 silicon atoms, these silicones optionally comprising alkyl or alkoxy groups containing from 1 to 10 carbon atoms. As volatile silicone oils that may be used in the invention, mention may be made especially of octamethylcyclotetrasiloxane, decamethylcyclopentasiloxane, dodecamethylcyclohexasiloxane, heptamethylhexyltrisiloxane, heptamethyloctyltrisiloxane, hexamethyldisiloxane, octamethyltrisiloxane, decamethyltetrasiloxane, dodecamethylpentasiloxane, and mixtures thereof.

Chelating Agent(s)

The cosmetic composition may, optionally, include chelating agents. The amount of chelating agent present in the cosmetic composition may be, e.g., about 0.01 to about 20 wt. %, about 0.01 to about 15 wt. %, about 0.01 to about 10 wt. %, about 0.01 to about 8 wt. %, about 0.01 to about 6 wt. %, about 0.01 to about 5 wt. %, about 0.01 to about 4 wt. %, about 0.01 to about 3 wt. %, about 0.01 to about 2 wt. %, about 0.01 to about 1 wt. %; about 0.1 to about 20 wt. %, about 0.1 to about 15 wt. %, about 0.1 to about 10 wt. %, about 0.1 to about 8 wt. %, about 0.1 to about 6 wt. %, about 0.1 to about 5 wt. %, about 0.1 to about 4 wt. %, about 0.1 to about 3 wt. %, about 0.1 to about 2 wt. % about 0.1 to about 1 wt. %; about 0.25 to about 20 wt. %, about 0.25 to about 15 wt. %, about 0.25 to about 10 wt. %, about 0.25 to about 8 wt. %, about 0.25 to about 6 wt. %, about 0.25 to about 5 wt. %, about 0.25 to about 4 wt. %, about 0.25 to about 3 wt. %, about 0.25 to about 2 wt. %, about 0.25 to about 1 wt. %; about 0.5 to about 20 wt. %, about 0.5 to about 15 wt. %, about 0.5 to about 10 wt. %, about 0.5 to about 8 wt. %, about 0.5 to about 6 wt. %, about 0.5 to about 5 wt. %, about 0.5 to about 4 wt. %, about 0.5 to about 3 wt. %, about 0.5 to about 2 wt. %, about 0.5 to about 1 wt. %; about 0.75 to about 20 wt. %, about 0.75 to about 15 wt. %, about 0.75 to about 10 wt. %, about 0.75 to about 8 wt. %, about 0.75 to about 6 wt. %, about 0.75 to about 5 wt. %, about 0.75 to about 4 wt. %, about 0.75 to about 3 wt. %, about 0.75 to about 2 wt. %; about 1 to about 20 wt. %, about 1 to about 15 wt. %, about 1 to about 10 wt. %, about 1 to about 8 wt. %, about 1 to about 6 wt. %, about 1 to about 5 wt. %, about 1 to about 4 wt. %, about 1 to about 3 wt. %, or about 1 to about 2 wt. %, including ranges and subranges therebetween, based on the total weight of the cosmetic composition.

Non-limiting examples of chemical chelating agents include aminotrimethyl phosphonic acid, ß-alanine diacetic acid, cyclodextrin, cyclohexanediamine tetracetic acid, diethylenetriamine pentamethylene phosphonic acid, diethanolamine N-acetic acid, ethylene diamine tetracetic acid (EDTA or $YH_4$) and its sodium ($YH_3Na$, $Y_2H_2Na_2$, $YHNa_3$ and $YNa_4$), potassium ($YH_3K$, $Y_2H_3K_3$ and $YK_4$), calcium disodium, and diammonium salts and its salts with triethanolamine (TEA-EDTA), etidronic acid, galactanic acid, hydroxyethyl ethylenediamine tetracetic acid (HEDTA) and its trisodium salt, gluconic acid, glucuronic acid, nitrilotriacetic acid (NTA) and its trisodium salt, pentetic acid, phytic acid, ribonic acid, diammonium citrate, disodium azacycloheptane diphosphonate, disodium pyrophoshate, hydroxypropyl cyclodextrin, methyl cyclodextrin, pentapotassium triphosphate, pentasodium aminotrimethylene phosphonate, pentasodium ethylenediamine tetramethylene phosphonate, pentasodium pentetate, pentasodium triphosphate, potassium citrate, potassium EDTMP, sodium EDTMP, sodium chitosan methylene phosphonate, sodium hexametaphosphate, sodium metaphosphate, potassium polyphosphate, sodium polyphosphate, sodium trimetaphosphate, sodium dihydroxyethylglycinate, potassium gluconate, sodium gluconate, sodium glucopeptate, sodium glycereth-1 polyphosphate, tetrapotassium pyrophosphate, triethanolamine polyphosphate (TEA), tetrasodium pyrophosphate, trisodium phosphate, potassium triphosphonomethylamine oxide, sodium metasilicate, sodium phytate, sodium polydimethylglycinophenolsulfonate, tetrahydroxyethyl ethylene diamine, tetrahydroxypropyl ethylene diamine, tetrapotassium etidronate, tetrasodium etidronate, tetrasodium iminodisuccinate, trisodium ethylenediamine disuccinate, ethanolamine N,N-diacetic acid, disodium acetate, dimercaprol, deferoxamine, Zylox, and/or iron chelating agent disclosed and claimed in the international patent application WO 94/61338, which is incorporated herein in its entirety for all purposes. Examples of biological chelating agents include metallothionein, transferrin, calmodulin, and sodium chitosan methylene phosphonate.

In at least one instance, the chelating agent is trisodium ethylenediamine disuccinate.

pH Adjuster(s)

The cosmetic composition may include one or more pH adjusters to increase or decrease the overall pH of the cosmetic composition. For example, one or more acids may be included to decrease the pH of the cosmetic composition. Examples of suitable acids for decreasing the pH of the cosmetic composition include, but are not limited to, citric acid, acetic acid, and the like. The cosmetic composition may include one or more bases, such as sodium hydroxide, potassium hydroxide and the like, to decrease the pH of the cosmetic composition. Additional or alternative acids and bases that are suitable for adjusting the pH of the cosmetic composition are readily known to one of ordinary skill in the art.

The cosmetic composition may, desirably, have a pH of about 5.5 to about 7, preferably about 5.5 to about 6.5. In one instance, the pH of the cosmetic composition is 6 or about 6. The amount of the pH adjuster in the cosmetic composition may be based on the desired pH of the final cosmetic composition and/or product. For example, the total amount of the pH adjuster may range from about 0.05 to about 20 wt. %, based on the total weight of the composition. In some instances, the total amount of pH adjuster is from about 0.01 to about 20 wt. %, about 0.01 to about 15 wt. %, about 0.01 to about 10 wt. %, about 0.01 to about 5 wt. %, about 0.01 to about 4 wt. %, or about 0.01 to about 3 wt. %; about 0.05 to about 20 wt. %, about 0.05 to about 15 wt. %, about 0.05 to about 10 wt. %, about 0.05 to about 5 wt. %, about 0.05 to about 4 wt. %, about 0.05 to about 3 wt. %; about 1 to about 20 wt. %, about 1 to about 15 wt. %, about 1 to about 10 wt. %, about 1 to about 5 wt. %, about 1 to about 4 wt. %, or about 1 to about 3 wt. %; about 2 to about 20 wt. %, about 2 to about 15 wt. %, about 2 to about 10 wt. %, about 2 to about 5 wt. %, or about 2 to about 4 wt. %, including ranges and sub-ranges therebetween, based on the total weight of the composition.

Water

The total amount of water in the cosmetic composition can vary, but is typically about 50 to about 95 wt. %, based on the total weight of the cosmetic composition. In some instances, total amount of water is about 50 to about 90 wt. %, about 50 to about 85 wt. %, about 50 to about 80 wt. %; about 55 to about 95 wt. %, about 55 to about 90 wt. %, about 55 to about 85 wt. %, about 55 to about 80 wt. %; about 60 to about 95 wt. %, about 60 to about 90 wt. %, about 60 to about 85 wt. %, about 60 to about 80 wt. %; about 65 to about 95 wt. %, about 65 to about 90 wt. %, about 65 to about 85 wt. %, or about 65 to about 80 wt. %; about 70 to about 95 wt. %, about 70 to about 90 wt. %, about 70 to about 85 wt. %, about 70 to about 80 wt. %, including ranges and subranges therebetween, based on the total weight of the cosmetic composition.

Methods of Production

The instant disclosure also relates to methods or processes for making/manufacturing the cosmetic compositions described herein. It also encompasses the products prepared by these methods or processes.

A process for making certain embodiments of the cosmetic composition includes the formation of an oil phase and the formation of a separate aqueous phase (containing water), both phases are heated and combined while warm. Each phase may be heated to the same temperature or may be heated to different temperatures.

The thickening agents may be added to the aqueous phase of the cosmetic compositions. In some instances, however, the one or more emulsifiers and/or the thickening agents are added to the oil phase. Additionally or alternatively, thickening agents may be added post-emulsification—for instance, ammonium polyacryloyldimethyl taurate may be added post-emulsification.

After combining the oil phase and the aqueous phase to form an emulsion, the composition is typically allowed to cool. Additional components may be added during the time of emulsification or after. For example, certain fragrances, colorings, exfoliants, active ingredients, etc., may be added to the aqueous phase, the fatty phase, or after emulsification.

Methods of Use

The instant disclosure also relates to methods of using the cosmetic compositions described herein. For example, the cosmetic compositions can be used in a method that comprises applying the cosmetic compositions to the skin of humans. In some cases, the composition is applied to the face. Furthermore, the cosmetic composition can be used in methods for treating and/or repairing damage to skin (for example, damage from photoaging), and for diminishing the appearance of wrinkles, dark spots, and uneven skin texture of skin. The aforementioned methods are non-therapeutic.

The cosmetic composition may be applied once per day, twice per day, or more than once or twice per day. In some cases, the composition is applied in the evenings before bed. In other cases, the compositions are applies in the morning. In still other cases, the composition may be applied immediately after washing the skin. The compositions may be used once, or for a series of days, weeks, or months. For example, the compositions may be used daily for a period of 1, 2, 3, 4, 5, 6, 7, 8 or more weeks, or months.

EMBODIMENTS

In certain embodiments, the cosmetic compositions of the instant disclosure typically include:

about 0.1 to about 10 wt. %, preferably about 0.25 to about 10 wt. %, more preferably about 0.5 to about 8 wt. %, of a nonionic emulsifier, the nonionic emulsifier comprising polyglyceryl-3 methylglucose distearate;

about 0.1 to about 10 wt. %, preferably about 0.25 to about 10 wt. %, more preferably about 0.5 to about 8 wt. %, of sodium polyacrylate;

about 0.5 to about 15 wt. %, preferably about 0.75 to about 12.5 wt. %, more preferably about 0.75 to about 8 wt. %, of aluminum starch octenylsuccinate;

about 0.1 to about 20 wt. %, preferably about 0.5 to about 14 wt. %, more preferably about 2 to about 12 wt. %, of a fatty phase that is a liquid at a temperature of 25° C. or more, wherein the fatty phase comprises one or more fatty compounds, such as those chosen from fatty alcohols, fatty acids, fatty esters, oils, waxes, derivatives thereof, and mixtures thereof; and water, preferably about 50 to about 95 wt. % of water, more preferably about 60 to about 95 wt. % of water, wherein the cosmetic composition is an oil-in-water emulsion and all weight percentages are based on the total weight of the cosmetic composition.

In further embodiments, provided is a cosmetic composition consisting of:

about 0.1 to about 10 wt. %, preferably about 0.25 to about 10 wt. %, more preferably about 0.5 to about 8 wt. %, of a nonionic emulsifier, the nonionic emulsifier comprising polyglyceryl-3 methylglucose distearate;

about 0.1 to about 10 wt. %, preferably about 0.25 to about 10 wt. %, more preferably about 0.5 to about 8 wt. %, of sodium polyacrylate;

about 0.5 to about 15 wt. %, preferably about 0.75 to about 12.5 wt. %, more preferably about 0.75 to about 8 wt. %, of aluminum starch octenylsuccinate;

about 0.1 to about 20 wt. %, preferably about 0.5 to about 14 wt. %, more preferably about 2 to about 12 wt. %, of a fatty phase that is a liquid at a temperature of 25° C. or more, wherein the fatty phase comprises one or more fatty compounds, such as those chosen from fatty alcohols, fatty acids, fatty esters, oils, waxes, derivatives thereof, and mixtures thereof;

water, preferably about 50 to about 95 wt. % of water, more preferably about 60 to about 95 wt. % of water;

optionally, about 0.1 to about 30 wt. %, preferably about 5 to about 25 wt. %, more preferably about 10 to about 20 wt. % of a water-soluble solvent including, e.g., glycerin, alcohols, organic solvents, polyols, glycols, and a mixture thereof;

optionally, about 0.1 to about 20 wt. %, preferably about 0.1 to about 16 wt. %, more preferably about 0.1 to about 7 wt. %, of a non-sodium polyacrylate thickening agent including those chosen from ammonium polyacryloyldimethyl taurate, ammonium acryloyldimethyltaurate/VP copolymer, sodium polyacrylate, acrylates copolymers, polyacrylamide, carbomer, acrylates/C10-30 alkyl acrylate crosspolymer, acrylates/beheneth-25 methacrylate copolymer, and a mixture thereof;

optionally, an amount up to about 20 wt. %, preferably about 1 to about 15 wt. %, more preferably about 2 to about 10 wt. %, of a skin active agent including, e.g., retinol, panthenol, niacinamide, and sodium hyaluronate;

optionally, about 0.01 to about 20 wt. %, preferably about 0.1 to about 18 wt. %, more preferably about 1 to about 10 wt. %, of a preservative, such as sodium benzoate, potassium sorbate, phenoxyethanol, salicylic acid, tocopherol, chlorphenesin, BHT, disodium EDTA, pentaerythrityl tetra-di-t-butyl hydroxyhydrocinnamate, and mixtures thereof;

optionally, about 0.1 to about 20 wt. %, preferably about 0.1 to about 14 wt. %, more preferably about 1 to about 12 wt. %, of a silicone oil such as dimethicone, cyclomethicone, polysilicone-11, phenyl trimethicone, trimethylsilylamodimethicone, and stearoxytrimethylsilane;

optionally, about 0.01 to about 20 wt. %, preferably about 0.1 to about 15 wt. %, more preferably about 0.25 to about 10 wt. %, of a chelating agent, such as trisodium ethylenediamine disuccinate; and optionally, about 0.01 to about 20 wt. % of a pH adjuster, including, e.g., citric acid and sodium hydroxide, wherein the cosmetic composition is an oil-in-water emulsion and all weight percentages are based on the total weight of the cosmetic composition.

EXAMPLES

The following examples are provided primary for the purpose of elucidating the benefits achieved by embodiments of the disclosure. The examples serve to illustrate the technology without necessarily being limiting in nature.

Example 1

| | INCI US Name | EXAMPLE FORMULA A |
|---|---|---|
| (a) | POLYGLYCERYL-3 METHYLGLUCOSE DISTEARATE | 0.75 |
| (b) | SODIUM POLYACRYLATE | 1 |
| (c) | ALUMINUM STARCH OCTENYLSUCCINATE | 1 |
| (d) | CAPRYLIC/CAPRIC TRIGLYCERIDE | 1 |
| | ISONONYL ISONONANOATE | 2 |
| | GLYCINE SOJA (SOYBEAN) OIL | 1.8 |
| | Total Fatty Compounds | 4.8 |
| (f) | BUTYLENE GLYCOL | 8 |
| | CAPRYLYL GLYCOL | 0.3 |
| | GLYCERIN | 8 |
| (g) | ACRYLATES/BEHENETH-25 METHACRYLATE COPOLYMER | 0.15 |
| (h) | RETINOL (0.2 wt. %) PANTHENOL (0.5 wt. %), NIACINAMIDE (2 wt. %) and SODIUM HYALURONATE (0.1 wt. %) | 2.8 |
| (i) | PHENOXYETHANOL, DISODIUM EDTA, TOCOPHEROL, CHLORPHENESIN, and/or BHT | ≤2 |
| | PENTAERYTHRITYL TETRA-DI-T-BUTYL HYDROXYHYDROCINNAMATE | 0.1 |
| | SALTS (e.g., potassium phosphate), DIMETHICONE, CHELATING AGENTS (e.g., trisodium ethylenediamine disuccinate) | ≤2 |
| (e) | WATER | QS 100 |

Example 2

The flow behavior of was studied by using rheology. Viscoelastic and flow measurements were performed with a DHR-2 Rheometer (TA Instruments, New Castle, Delaware, USA) at 32° C. (skin temperature).

A parallel plate with a crosshatch surface (diameter=40 mm) was used in these rheology measurements.

For viscoelastic measurements, the strain sweep was performed from 0.01% to 1000% strain at a fixed frequency $\omega=1$ rad/s.

The complex modulus $G^*$ and phase angle $\delta$ are defined as below:

$$G^* = \sqrt{G'^2 + G''^2} \quad (4)$$

$$\tan\delta = \frac{G''}{G'} \quad (5)$$

where G' and G" are storage and loss moduli, respectively. When $$\tan\delta = \frac{G''}{G'} < 1$$

or phase angle $\delta<45°$, the system is elastic, and when $$\tan\delta = \frac{G''}{G'} > 1$$

or phase angle δ>45°, the system is viscous.

Rheological testing was performed on Example Compositions A to determine if Example Composition A exhibits a consistency close to serum with elasticity similar to a creme under small deformation. Rheological testing was also performed on two comparative commercial benchmark products (Comparative Example 1 and Comparative Example 2). The commercial benchmark products (Comparative Example 1 and Comparative Example 2) included the ingredients shown below.

Ingredients of Comparative Example 1 (Cream): Water, Pentaerythrityl Tetraethylhexanoate, Glycerin, Dimethicone, PPG-15 Stearyl Ether, Stearyl Alcohol, Cetearyl Alcohol, Butylene Glycol, Glyceryl Behenate, Ceteareth-20, Isohexadecane, Cyclopentasiloxane, Dimethicone Crosspolymer, Polyethylene, Sodium Polyacrylate, Phenoxyethanol, Caprylyl Glycol, Sodium Acryloyldimethyltaurate/VP Crosspolymer, Polyacrylamide, Fragrance, C13-14 Isoparaffin, PTFE, Chlorphenesin, Polysorbate 20, Hydrolyzed *Myrtus communis* Leaf Extract, Retinol, BHT, Sodium Hyaluronate, Disodium EDTA, Laureth-7, Sodium Hydroxide, and Ascorbic Acid.

Ingredients of Comparative Example 2 (Serum): Water, Dimethicone, Aluminum Starch Octenylsuccinate, Dimethicone Crosspolymer, Ammonium, Acryloyldimethyltaurate/VP Copolymer, Trisiloxane, Nylon-12, C12-15 Alkyl Benzoate, Ascorbyl Glucoside, Glycerin, Caprylyl Glycol, Polyacrylamide, Xanthan Gum, Fragrance, C13-14 Isoparaffin, Sodium Hyaluronate, Sodium Lactate, Hydrolyzed *Myrtus communis* Leaf Extract, Sodium Hydroxide, BHT, Disodium EDTA, Polysorbate 20, Laureth-7, Retinol, Sodium PCA, Sorbitol, Proline, Hinokitiol, Mica, Titanium Dioxide.

Based on the data shown in FIG. 1, Example Composition A exhibited a creme appearance before it received a shear stress.

Example 3

Figure 2:
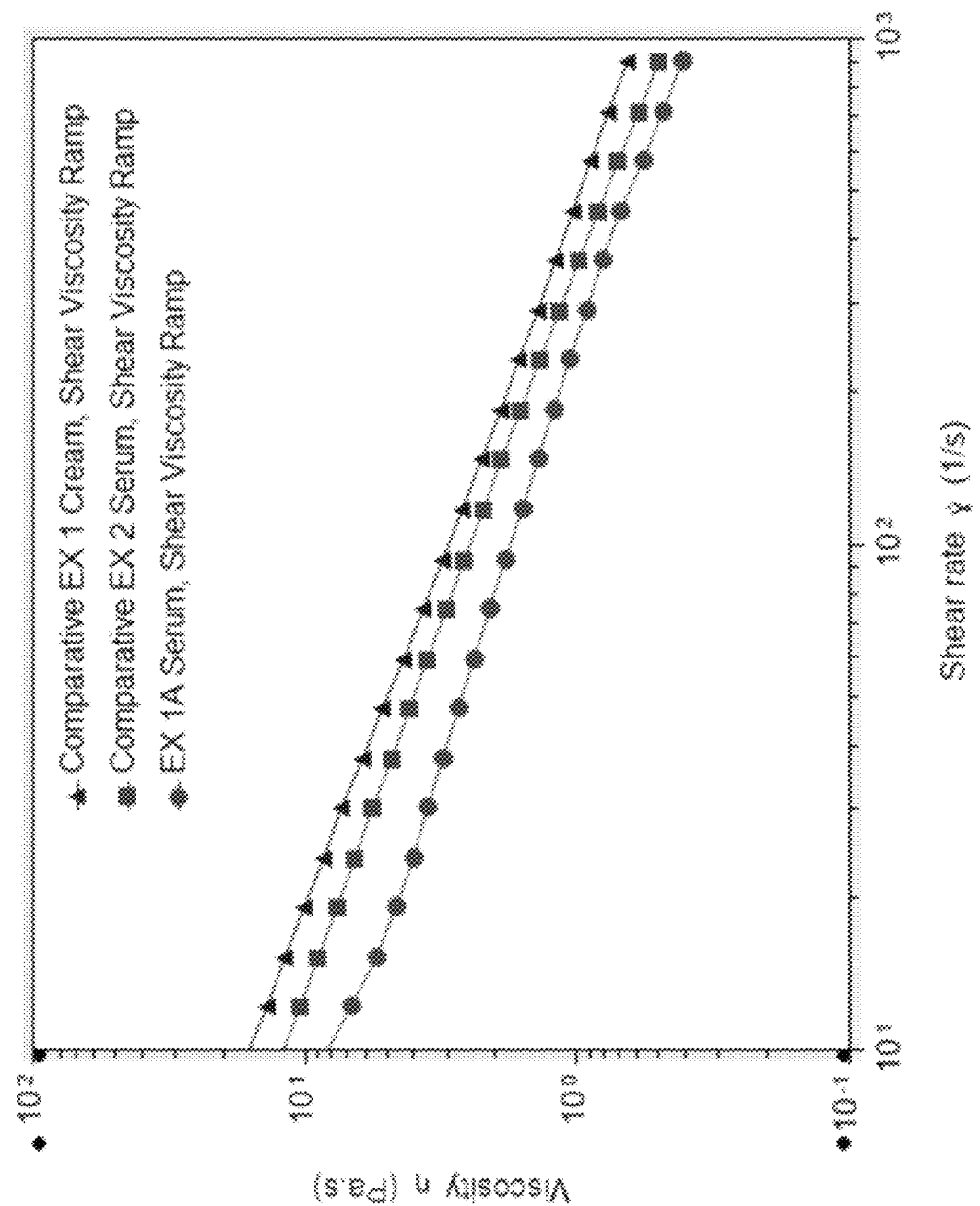
FIG. 2 is a graph of shear viscosity of exemplary and comparative cosmetic compositions in accordance with aspects of the disclosure.
Figure 3:
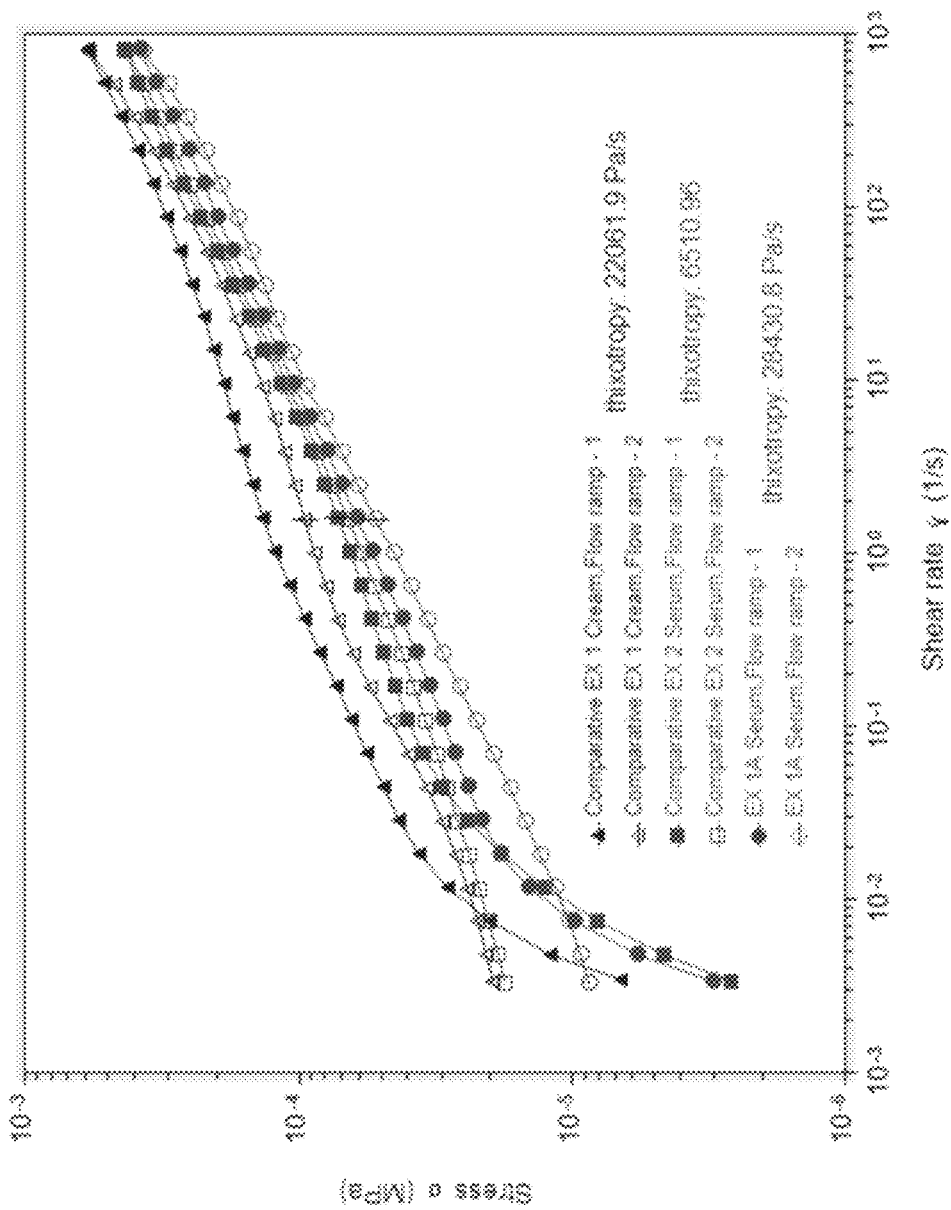
FIG. 3 is a graph of thixotropic behavior exemplary and comparative cosmetic compositions according to aspects of the disclosure.

Example Composition A was assessed to determine the fluidity of the composition upon application by a user. The shear viscosity of samples was carried out at a shear rate ranging from 0.001 (1/s) to 1000 (1/s) for 5 minutes. The shear viscosity was also determined for the two comparative commercial benchmark products (Comparative Example 1 and Comparative Example 2), used above in Example 2. The ingredients of the comparative examples are set forth in Example 2. The viscosity high-shear demonstrates that composition A possesses the fluidity of a serum (FIG. 2) while maintaining the playtime of a cream (FIG. 3).

Example 4

To evaluate time-dependent flow behavior of Example Composition A and the two commercial benchmark products (Comparative Example 1 and Comparative Example 2) during application, the deformation was carried out samples at which the stress was measured as function of shear rate range from low to high (0.001-1000 1/s) and from high to low (1000-0.001 1/s) for 2 min/each way. Thixotropy is indicated by the hysteresis loop which measures the time-dependent recovery of the serum formulation after it has been shear thinned. It was determined that Example Composition A exhibits thixotropy.

Example 5

Figure 4:
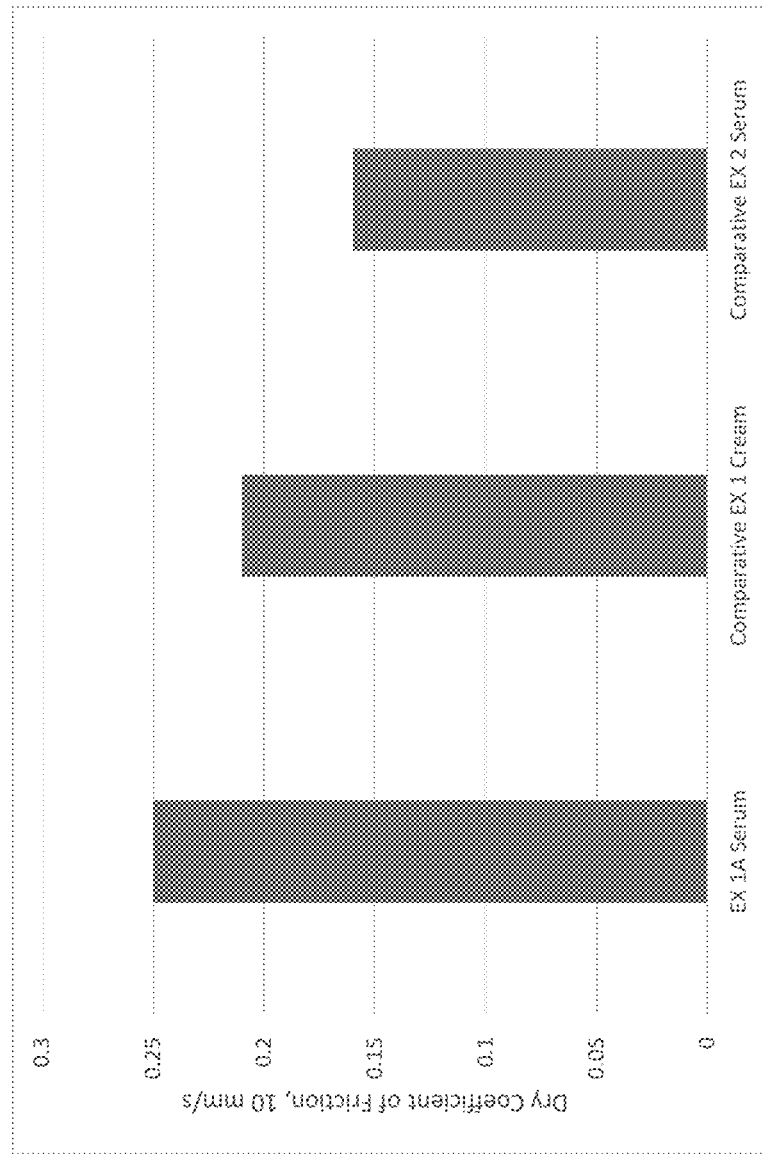
FIG. 4 is a graph of the coefficient of friction for an exemplary composition and comparative compositions in accordance with aspects of the disclosure.

The friction coefficient μ was determined from tribology experiment, which would describe these sensory and textures. The tribology was carried out with the rheometer described herein by using the ring accessory. FIG. 4 shows the selective friction coefficient μ at 3 rotation speeds of 10 mm/s, 100 mm/s and 1000 mm/s for the serum ex 1A and the comparative commercial benchmarks (Comparative Example 1 and Comparative Example 2) for which the ingredients are set forth above in Example 2.

Based on the tribology, it is expected that a user may feel slippery, sticky and absorption attributes associated with the cosmetic composition during the application of such composition. After application of the cosmetic product, it is expected that the sensorial feel and texture of the deposit change due to product drying out.

The term "INCI" is an abbreviation of International Nomenclature of Cosmetic Ingredients, which is a system of names provided by the International Nomenclature Committee of the Personal Care Products Council to describe personal care ingredients.

As used herein, all ranges provided are meant to include every specific range within, and combination of sub ranges between, the given ranges. Thus, a range from 1-5, includes specifically 1, 2, 3, 4 and 5, as well as sub ranges such as 2-5, 3-5, 2-3, 2-4, 1-4, etc.

All components and elements positively set forth in this disclosure can be negatively excluded from the claims. In other words, the cosmetic compositions of the instant disclosure can be free or essentially free of all components and elements positively recited throughout the instant disclosure.

In some instances, the cosmetic compositions of the present disclosure may be substantially free of non-incidental amounts of the ingredient(s) or compound(s) described herein. A non-incidental amount of an ingredient or compound is the amount of that ingredient or compound that is added into the cosmetic composition by itself. For example, a cosmetic composition may be substantially free of a non-incidental amount of an ingredient or compound, although such ingredient(s) or compound(s) may be present as part of a raw material that is included as a blend of two or more compounds.

Some of the various categories of components identified may overlap. In such cases where overlap may exist and the composition includes both components (or the composition includes more than two components that overlap), an overlapping compound does not represent more than one component. For example, tocopherol may be characterized as both a skin active agent and a preservative. If a particular composition includes both a skin active agent and a preservative, steareth-20 will serve only as the skin active agent or only as the preservative (tocopherol does not serve as both the skin active agent and preservative).

All publications and patent applications cited in this specification are herein incorporated by reference, and for any and all purposes, as if each individual publication or patent application were specifically and individually indicated to be incorporated by reference. In the event of an inconsistency between the present disclosure and any publications or patent application incorporated herein by reference, the present disclosure controls.

As used herein, the terms "comprising," "having," and "including" are used in their open, non-limiting sense.

The terms "a," "an," and "the" are understood to encompass the plural as well as the singular. Thus, the term "a mixture thereof" also relates to "mixtures thereof." Throughout the disclosure, the term "a mixture thereof" is used, following a list of elements as shown in the following example where letters A-F represent the elements: "one or more elements selected from the group consisting of A, B, C, D, E, F, and a mixture thereof." The term, "a mixture thereof" does not require that the mixture include all of A, B, C, D, E, and F (although all of A, B, C, D, E, and F may be included). Rather, it indicates that a mixture of any two or more of A, B, C, D, E, and F can be included. In other words, it is equivalent to the phrase "one or more elements selected from the group consisting of A, B, C, D, E, F, and a mixture of any two or more of A, B, C, D, E, and F."

The expression "one or more" means "at least one" and thus includes individual components as well as mixtures/combinations.

Other than in the operating examples, or where otherwise indicated, all numbers expressing quantities of ingredients and/or reaction conditions may be modified in all instances by the term "about," meaning within +/−5% of the indicated number.

The term "treat" (and its grammatical variations) as used herein refers to the application of the compositions of the present disclosure onto the surface of keratinous substrates such as hair on a user's head and/or body.

The term "substantially free" or "essentially free" as used herein means that there is less than about 2% by weight of a specific material added to a composition, based on the total weight of the compositions. Nonetheless, the compositions may include less than about 1 wt. %, less than about 0.5 wt. %, less than about 0.1 wt. %, or none of the specified material. All of the components set forth herein may be optionally included or excluded from the compositions/method/kits. When excluded, the compositions/methods/kits may be free or essentially free of the component. For example, a particular composition may be free or essentially free of silicones.

What is claimed is:

1. A cosmetic composition comprising:
   (a) about 0.1 to about 4 wt. % of polyglyceryl-3 methylglucose distearate;
   (b) about 0.5 to about 3 wt. % of sodium polyacrylate;
   (c) about 0.1 to about 5 wt. % of aluminum starch octenylsuccinate;
   (d) about 2 to about 12 wt. % of a fatty phase that is a liquid at a temperature of 25° C., wherein the fatty phase comprises one or more fatty compounds selected from fatty alcohols, fatty acids, fatty esters, oils, waxes, or mixtures thereof;
   (e) water; and
   (f) about 12 to about 25 wt. % of a water-soluble solvent selected from glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, or mixtures thereof; and
   (g) about 0.1 to about 5 wt. % of acrylates/beheneth-25 methacrylate copolymer;
   wherein the cosmetic composition is an oil-in-water emulsion,
   exhibits thixotropy during application,
   has a dry coefficient of friction of 0.2 to 0.3 at 10 mm/s,
   has a storage modulus (G') from 100 to 1,000 Pa, with a phase angle (δ) between 5° and 45°,
   is free from homopolymers of acrylic acid crosslinked with allyl ethers of sucrose or pentaerytritol and salts thereof and free from acrylates/C10-C30 alkyl acrylate crosspolymer; and
   all weight percentages are based on a total weight of the cosmetic composition.

2. The cosmetic composition of claim 1 comprising a fatty ester selected from ethoxylated fatty esters, sorbitan fatty esters, esters of stearates, esters of behenates, esters of arachidates, esters of palmitates, fatty acid esters of a sugar, or mixtures thereof.

3. The cosmetic composition of claim 1 comprising a fatty ester selected from cetearyl octanoate, isopropyl myristate, isopropyl palmitate, $C_{12}$-$C_{15}$ alkyl benzoate, 2-ethylphenyl benzoate, isopropyl lanolate, hexyl laurate, diisopropyl adipate, isononyl isononanoate, oleyl erucate, 2-ethylhexyl palmitate, isostearyl isostearate, diisopropyl sebacate, octanoates, decanoates or ricinoleates of alcohols or polyalcohols, hydroxylated esters, and pentaerythritol esters, or mixtures thereof.

4. The cosmetic composition of claim 1, wherein the one or more fatty compounds includes isononyl isononanoate, caprylic/capric triglyceride, and *Glycine soja* oil.

5. A cosmetic composition consisting of:
   (a) about 0.1 to about 10 wt. % of polyglyceryl-3 methylglucose distearate;
   (b) about 0.5 to about 3 wt. % of sodium polyacrylate;
   (c) about 0.5 to about 15 wt. % of aluminum starch octenylsuccinate;
   (d) about 2 to about 12 wt. % of a fatty phase that is a liquid at a temperature of 25° C. or more, wherein the fatty phase comprises one or more fatty compounds;
   (e) water;
   (f) about 12 to about 25 wt. % of a water-soluble solvent selected from glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, or a mixture thereof;
   (g) about 0.1 to about 5 wt. % of acrylates/beheneth-25 methacrylate copolymer;
   (h) an amount greater than zero up to about 10 wt. % of a skin active agent;
   (i) about 0.01 to about 10 wt. % of a preservative;
   (j) optionally, about 0.1 to about 10 wt. % of a silicone oil;
   (k) optionally, about 0.01 to about 5 wt. % of a chelating agent;
   (l) about 0.01 to about 5 wt. % of a pH adjuster, and
   (m) optionally, a fragrance, a coloring, an exfoliant, or a mixture thereof;
   wherein the composition exhibits thixotropy during application,
   has a pH from about 5.5 to about 7, and
   all weight percentages are based on a total weight of the cosmetic composition.

6. The cosmetic composition of claim 5 having a playtime of about 2 or more seconds.

7. The cosmetic composition of claim 5 having a coefficient of friction of 0.3 or less at 10 mm/s.

8. A cosmetic composition comprising:
(a) about 0.1 to about 4 wt. % of polyglyceryl-3 methylglucose distearate;
(b) about 0.5 to about 3 wt. % of sodium polyacrylate;
(c) about 0.1 to about 5 wt. % of a mattifying agent;
(d) about 2 to about 12 wt. % of a fatty phase that is a liquid at a temperature of 25° C., wherein the fatty phase comprises one or more fatty compounds;
(e) water; and
(f) about 12 to about 25 wt. % of a water-soluble solvent selected from glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, polyethylene glycol, 1,2,4-butanetriol, 1,2,6-hexanetriol, or a mixture thereof;
(g) about 0.1 to about 5 wt. % of acrylates/beheneth-25 methacrylate copolymer;
wherein the cosmetic composition is an oil-in-water emulsion,
exhibits thixotropy during application,
has a dry coefficient of friction of 0.2 to 0.3 at 10 mm/s,
has a storage modulus (G') from 100 to 1,000 Pa, with a phase angle ($\delta$) between 5° and 45°,
is free from homopolymers of acrylic acid crosslinked with allyl ethers of sucrose or pentaerytritol and salts thereof and free from acrylates/C10-C30 alkyl acrylate crosspolymer; and
all weight percentages are based on a total weight of the cosmetic composition.

9. The cosmetic composition of claim 1, wherein the cosmetic composition has a pH from about 5.5 to about 7.

10. The composition of claim 1, wherein the cosmetic composition has a pH from about 5.5 to about 6.5.

11. The cosmetic composition of claim 8, wherein the one or more fatty compounds of (d) are selected from fatty alcohols, fatty acids, fatty esters, oils, waxes, or mixtures thereof.

12. The cosmetic composition of claim 11, wherein at least one of the one or more fatty compounds is a fatty ester selected from (cetearyl octanoate), isopropyl myristate, isopropyl palmitate, $C_{12}$-$C_{15}$alkyl benzoate, 2-ethylphenyl benzoate, isopropyl lanolate, hexyl laurate, diisopropyl adipate, isononyl isononanoate, oleyl erucate, 2-ethylhexyl palmitate, isostearyl isostearate, diisopropyl sebacate, octanoates, decanoates or ricinoleates of alcohols or polyalcohols, hydroxylated esters, and pentaerythritol esters, or mixtures thereof.

13. The cosmetic composition of claim 12, wherein the one or more fatty compounds include isononyl isononanoate, caprylic/capric triglyceride, and *Glycine soja* oil.

14. The cosmetic composition of claim 8, wherein the pH of the cosmetic composition is from about 5.5 to about 7.

15. The composition of claim 8, wherein the pH of the cosmetic composition is from about 5.5 to about 6.5.

* * * * *